United States Patent
Arisawa et al.

(10) Patent No.: US 11,613,663 B2
(45) Date of Patent: Mar. 28, 2023

(54) INK COMPOSITION, WRITING TOOL AND METHOD FOR PRODUCING INK COMPOSITION

(71) Applicant: PENTEL KABUSHIKI KAISHA, Tokyo (JP)

(72) Inventors: Katsuji Arisawa, Saitama (JP); Yoshitaka Morimoto, Saitama (JP); Hirohisa Suzuki, Saitama (JP); Hiroyuki Saitou, Ibaraki (JP)

(73) Assignee: PENTEL KABUSHIKI KAISHA

( * ) Notice: Subject to any disclaimer, the term of this patent is extended or adjusted under 35 U.S.C. 154(b) by 996 days.

(21) Appl. No.: 16/344,006

(22) PCT Filed: Apr. 28, 2017

(86) PCT No.: PCT/JP2017/016908
§ 371 (c)(1),
(2) Date: Apr. 22, 2019

(87) PCT Pub. No.: WO2018/083824
PCT Pub. Date: May 11, 2018

(65) Prior Publication Data
US 2019/0338151 A1    Nov. 7, 2019

(30) Foreign Application Priority Data

Nov. 4, 2016 (WO) .................. PCT/JP2016/082848

(51) Int. Cl.
*C09D 11/18* (2006.01)
*C08K 3/013* (2018.01)
(Continued)

(52) U.S. Cl.
CPC ................ *C09D 11/18* (2013.01); *B43K 1/08* (2013.01); *B43K 7/02* (2013.01); *C08K 3/013* (2018.01);
(Continued)

(58) Field of Classification Search
None
See application file for complete search history.

(56) References Cited

U.S. PATENT DOCUMENTS

| 6,312,510 B1 | 11/2001 | Kamagata et al. ......... 106/31.6 |
| 6,451,099 B1 | 9/2002 | Miyamoto et al. ....... 106/31.86 |
| 2012/0316276 A1* | 12/2012 | Iwasa .................... C09D 11/17 977/773 |

FOREIGN PATENT DOCUMENTS

| EP | 1041128 | 10/2000 |
| EP | 2514792 | 10/2012 |
(Continued)

OTHER PUBLICATIONS

Notice of Reasons for Refusal dated Jan. 26, 2021 issued in JP Application No. 2018-548547.
(Continued)

*Primary Examiner* — Joshua D Zimmerman
(74) *Attorney, Agent, or Firm* — Adams & Wilks

(57) ABSTRACT

The ink composition contains titanium oxide particles having an average particle size of 0.1 μm or more and 0.4 μm or less, hollow resin particles having an average particle size
(Continued)

of 1.0 μm or more and 2.0 μm or less, a polysaccharide and water, wherein the titanium oxide particles and the hollow resin particles are negatively charged.

13 Claims, 6 Drawing Sheets

(51) Int. Cl.
*B43K 1/08* (2006.01)
*B43K 7/02* (2006.01)
*C08L 5/00* (2006.01)
*C08L 25/04* (2006.01)
*C08L 83/04* (2006.01)
*C09D 11/104* (2014.01)
*C09D 11/106* (2014.01)
*C09D 11/17* (2014.01)
*C08K 3/22* (2006.01)

(52) U.S. Cl.
CPC ............... *C08L 5/00* (2013.01); *C08L 25/04* (2013.01); *C08L 83/04* (2013.01); *C09D 11/104* (2013.01); *C09D 11/106* (2013.01); *C09D 11/17* (2013.01); *C08K 2003/2237* (2013.01)

(56) References Cited

FOREIGN PATENT DOCUMENTS

| JP | 7150083 | 6/1995 |
| JP | 8335503 | 12/1996 |
| JP | 9316383 | 12/1997 |
| JP | 2001088490 | 4/2001 |
| JP | 2001180177 | 7/2001 |
| JP | 2009185166 | 8/2009 |
| JP | 2011202086 | 10/2011 |
| JP | 2011202086 A * | 10/2011 |
| JP | 2016108557 | 6/2016 |
| WO | 1998036033 | 8/1998 |

OTHER PUBLICATIONS

International Preliminary Report on Patentability dated May 16, 2019 issued in International Application No. PCT/JP2016/082848.
International Preliminary on Patentability dated May 16, 2019 issued in International Appliation No. PCt/JP2017/016908.
European Search Report dated May 29, 2020 issued in Application No. EP 17867641.7.

* cited by examiner

INK COMPOSITION, WRITING TOOL AND METHOD FOR PRODUCING INK COMPOSITION

TECHNICAL FIELD

The present disclosure related to an ink composition, a writing tool and a method for producing an ink composition.

BACKGROUND

There are increasing occasions in recent years of hand writing on surfaces printed in colour such as documents copied in colour or printed by colour printers, and writing pads, note pads, design printed matters and message cards on which characters and the like are printed in colour. In order to form a sufficiently visible writing line on the surfaces printed in colour, it is required to form an opaque and masking writing line that is not affected by the base colour as much as possible, and thus inks containing masking agents such as titanium oxide are used.

For example, Patent Document 1 discloses a ballpoint pen capable of recording a clear writing line on a dark coloured paper, containing an aqueous ink comprising 15 wt % to 25 wt % of titanium oxide and resin particles that have an average particle size of about 0.4 µm to 0.5 µm and containing 30 to 55.0 wt % of solid matters relative to the total amount of the ink.

Patent Document 2 discloses an ink composition for an aqueous ballpoint pen, containing in combination titanium oxide and hollow resin particles having a masking effect and a specific gravity that is smaller than that of titanium oxide.

CITATION LIST

Patent Literature

Patent Document 1: JP2001-180177A
Patent Document 2: JP2009-185166A

SUMMARY

Technical Problem

Titanium oxide having the effect of imparting masking ability to ink is particles having a relatively high specific gravity, and thus may easily precipitate in ink compositions and may not provide preferable dispersion stability. In this regard, the ink composition disclosed in Patent Document 2 contains hollow resin particles that have a masking effect while having a relatively low specific gravity together with titanium oxide in order to decrease the content of titanium oxide and increase dispersion stability.

However, there is still a need for increasing dispersion stability while keeping masking ability in ink compositions.

With the foregoing in view, an object of at least one embodiment of the present invention is to provide an ink composition having preferable masking ability and dispersion stability.

Solution to Problem (1) An ink composition according to at least one embodiment of the present invention contains:
titanium oxide particles having an average particle size of 0.1 µm or more and 0.4 µm or less;
hollow resin particles having an average particle size of 1.0 µm or more and 2.0 µm or less;
a polysaccharide; and
water; wherein
the titanium oxide particles and the hollow resin particles are negatively charged.

The hollow resin particles have a hollow structure, and thus have a masking effect and have a specific gravity that is significantly lower than that of the titanium oxide particles.

In the ink composition according to (1), the titanium oxide particles and the hollow resin particles are captured in the network structure of the polysaccharide, and a complex containing the polysaccharide, the titanium oxide particles and the hollow resin particles is formed. Therefore, the complex as a whole has a specific gravity that is lower than that of titanium oxide, and thus the ink composition may have an increased dispersion stability.

In the ink composition according to (1), titanium oxide particles and hollow resin particles are both negatively charged. Therefore, it is believed that the titanium oxide particles and the hollow resin particles in the ink composition electrostatically repel each other, the titanium oxide entered the gap's between hollow resin particles in the ink composition preventing aggregation of the hollow resin particles, as well as the hollow resin particles preventing aggregation of titanium oxide and suppressing aggregation of particles, thereby providing a highly uniform complex without unevenly distributed particles and providing dispersion stability The ink composition according to (1) contains the titanium oxide particles having an average particle size of 0.1 µm or more and 0.4 µm or less and the hollow resin particles having an average particle size of 1.0 µm or more and 2.0 µm or less, the hollow resin particles have an appropriate size relative to the titanium oxide particles, and the titanium oxide particles and the hollow resin particles are negatively charged. Therefore, it is believed that the titanium oxide particles can efficiently enter the gaps between the hollow resin particles and thus particles may be easily aligned in a minute manner in a dried writing line after writing, thereby providing a writing line with less gaps between the particles and with high masking effect.

When hollow resin particles and titanium oxide particles form coarse aggregates in an ink composition, it is difficult to obtain the complex with less gaps between the particles even if the hollow resin particles are configured to have an appropriate particle size relative to the titanium oxide particles. In this regard, in the ink composition according to (1), the titanium oxide particles and the hollow resin particles are both negatively charged, and thus the titanium oxide particles and the hollow resin particles repel each other in the ink composition, suppressing aggregation of the particles and easily providing the complex with less gaps between the particles.

(2) In some embodiments, the hollow resin particles are devoid of a colouring material adsorbed thereto in the configuration according to (1).

According to the configuration in (2), the effect of (1) can be obtained with the hollow resin particles devoid of a colouring material adsorbed thereto.

The phrase "devoid of a colouring material adsorbed thereto" as used herein means that a colouring material is not deliberately adsorbed to the hollow resin particles. Therefore, the phrase "devoid of a colouring material adsorbed thereto" applies when most of the colouring material added in order to colour the ink composition is not adsorbed to the hollow resin particles and a minute amount of the colouring material is adsorbed to the hollow resin particles.

The presence of a colouring material attached to the hollow resin particles may be observed by separating the hollow resin particles from the ink composition and observing the same under an electron microscope or an optical microscope (magnification of about 400- to 10000-fold).

(3) In some embodiments, the hollow resin particles contain styrene-acrylic copolymer particles in the configuration according to (1) or (2).

The hollow particles made of a styrene-acrylic copolymer have appropriate elasticity. Therefore, a complex containing the polysaccharide having a network structure and hollow particles made of a styrene-acrylic copolymer may easily undergo elastic deformation. Therefore, when the ink composition in (3) is used for a writing tool or the like, an impact may be relaxed when the writing tool or the like is dropped. Thus, even when a writing tool, for example, is dropped, an entrainment of air to the distal section of the writing tool may be suppressed, thereby reducing starving during writing.

(4) In some embodiments, the titanium oxide particles have an oil absorption of 29 g/100 g or more and 35 g/100 g or less in the configuration according to any of (1) to (3).

According to the finding by the inventors of the present invention, titanium oxide particles having an oil absorption of 29 W100 g or more and 35 g/100 g or less may maintain appropriate distances between the titanium oxide particles in the network structure of the polysaccharide, while forming a film of the complex due to the interaction with other resin particles and the like. Thus, when the ink composition in (4) is used for a writing tool or the like, an impact may be more effectively relaxed when the writing tool or the like is dropped.

(5) In some embodiments, the configuration according to any of (1) to (4) contains:

5.0 wt % or more and 40.0 wt % or less of the titanium oxide particles; and 5.0 wt % or more and 20.0 wt % or less of the hollow resin particles.

The ink composition of (5) contains 5.0 wt % or more and 40.0 wt % or less of the titanium oxide particles, and thus has preferable masking ability. The ink composition of (5) also contains 5.0 wt % or more and 20.0 wt % or less of the hollow resin particles, and thus can sufficiently decrease the specific gravity of the complex as a whole. According to the ink composition in (5), preferable masking ability and preferable dispersion stability may be obtained.

(6) In some embodiments, the ink composition further contains a surfactant in the configuration according to any of (1) to (5).

Hydrophilic groups of a surfactant interact with hydrophilic groups of the polysaccharide and hydrophobic groups of a surfactant interact with hydrophobic groups of the titanium oxide particles and the resin particles such as the hollow resin particles. As a result of this, the surfactant serves as a binder for binding the polysaccharide having a network structure and the titanium oxide particles or the hollow resin particles. According to the configuration in (6), the ink composition which contains a surfactant can form a complex in which a network structure of the polysaccharide binds to a cross-linked structure of the surfactant containing the titanium oxide particles or the hollow resin particles. As a result of this, the complex may have a more stabilized network structure and the titanium oxide particles and the hollow resin particles may have increased dispersion stability.

(7) In some embodiments, the surfactant contains a silicone active agent in the configuration according to (6):

According to the configuration in (7), the surfactant contains a silicone active agent, and thus a complex formed from the polysaccharide, the titanium oxide particles and the like and the silicone active agent has steric hinderance having the polysiloxane structure and forms inter-adsorption including physisorption and chemisorption. Therefore, when a writing tool receives an impact at the time of dropping and the like, flexible plastic deformation and elastic shape restoration occur, and thus the received impact may be effectively relaxed and a preferable flowability of the ink composition may be maintained.

(8) In some embodiments, the ink composition further contains a film-forming resin in the configuration according to any of (1) to (7).

The film-forming resin is used for the purpose of forming a film on the writing line (such as titanium oxide particles) of the ink composition when a dispersion medium (liquid) is evaporated during formation of a writing line of the ink composition. In the ink composition, the film-forming resin adsorbs to the titanium oxide particles or the hollow resin particles to contribute to steric hinderance and increases dispersion stability of the titanium oxide particles or the hollow resin particles. In this regard, according to the configuration in (8), the ink composition contains the film-forming resin, and thus can have further increased dispersion stability (9) In some embodiments, the film-forming resin contains at least one of an acrylic resin or a polyester resin in the configuration according to (8).

A polyester resin or an acrylic resin forms a film having a higher cushioning effect as a result of interaction thereof with the titanium oxide particles, the hollow resin particles or the polysaccharide. Therefore, according to the configuration in (9), an impact may be effectively relaxed when a writing tool or the like is dropped. Even when a writing tool, for example, is dropped, an entrainment of air to the distal section of the writing tool may be effectively suppressed, thereby reducing starving during writing.

(10) In some embodiments, the polyester resin is a saturated polyester resin in the configuration according to (9).

According to the configuration in (10), the saturated polyester resin having relatively high flexibility may form a film having preferable flexibility Therefore, an impact may be more effectively relaxed when a writing tool or the like is dropped. Even when a writing tool, for example, is dropped, an entrainment of air to the distal section of the writing tool may be more effectively suppressed, thereby reducing starving during writing.

(11) In some embodiments, the ink composition further contains a colouring material in the configuration of any of (1) to (10).

According to the configuration in (11), the ink composition further contains a colouring material, and thus the ink composition having preferable masking ability and dispersion stability may be used for colouring planes of paper and the like.

(12) An ink writing tool according to at least one embodiment of the present invention contains:

a writing section; and an ink storage section that stores the ink composition according to any of (1) to (11), wherein the writing tool is configured to supply the ink composition from the ink storage section to the writing section.

According to the configuration in (12), in the ink composition, the titanium oxide particles and the hollow resin particles are captured in the network structure of the polysaccharide, and a complex containing the polysaccharide, the titanium oxide particles and the hollow resin particles is formed. Therefore, the complex as a whole has a specific gravity that is lower than that of the titanium oxide particles, and thus the ink composition may have an increased dispersion stability.

The ink composition in the writing tool according to (12) contains the titanium oxide particles having an average particle size of 0.1 μm or more and 0.4 μm or less and the hollow resin particles having an average particle size of 1.0 μm or more and 2.0 μm or less. Namely, the hollow resin particles have an appropriate size relative to the titanium oxide particles, and thus the titanium oxide particles can efficiently enter the gaps between the hollow resin particles in the ink composition, thereby forming a complex with high density. Therefore, the ink composition may have increased dispersion stability while having preferable masking ability imparted thereto.

When hollow resin particles and titanium oxide particles form coarse aggregates in an ink composition, it is difficult to obtain the complex with high density even if the hollow resin particles are configured to have an appropriate particle size relative to the titanium oxide particles. In this regard, in the ink composition in the writing tool of (12), the titanium oxide particles and the hollow resin particles are both negatively charged, and thus the titanium oxide particles and the hollow resin particles repel each other in the ink composition, suppressing aggregation of the particles and easily providing the complex with high density.

(13) A method for producing an ink composition according to at least one embodiment of the present invention includes a step of dispersing, in water, titanium oxide particles having an average particle size of 0.1 μm or more and 0.4 μm or less, hollow resin particles having an average particle size of 1.0 μm or more and 2.0 μm or less and a polysaccharide.

In the ink composition obtained by the method according to (13), the titanium oxide particles and the hollow resin particles are captured in the network structure of the polysaccharide, and a complex containing the polysaccharide, the titanium oxide particles and the hollow resin particles is formed. Therefore, the complex as a whole has a specific gravity that is lower than that of the titanium oxide particles, and thus the ink composition may have increased dispersion stability.

In the ink composition obtained by the method according to (13), the titanium oxide particles and the hollow resin particles are both negatively charged, and thus it is believed that the titanium oxide particles and the hollow resin particles repel each other in the ink composition, titanium oxide entered the gaps between hollow resin particles in the ink composition prevents aggregation of the hollow resin particles, as well as the hollow resin particles prevent aggregation of titanium oxide and suppress aggregation of the particles, thereby providing a highly uniform complex without unevenly distributed particles and providing dispersion stability.

The ink composition obtained by the method according to (13) contains the titanium oxide particles having an average particle size of 0.1 μm or more and 0.4 μm or less and the hollow resin particles having an average particle size of 1.0 μm or more and 2.0 μm or less, the hollow resin particles have an appropriate size relative to the titanium oxide particles, and the titanium oxide particles and the hollow resin particles are negatively charged. Therefore, it is believed that the titanium oxide particles can efficiently enter the gaps between the hollow resin particles and thus particles may be easily aligned in a minute manner in the dried writing line after writing, thereby providing the writing line with less gaps between the particles and thus with high masking ability. Therefore, the ink composition may have increased dispersion stability while having preferable masking ability imparted thereto.

When hollow resin particles and titanium oxide particles form coarse aggregates in an ink composition, it is difficult to obtain the complex with less gaps between the particles even if the hollow resin particles are configured to have an appropriate particle size relative to the titanium oxide particles. In this regard, in the ink composition obtained by the method according to (13), the titanium oxide particles and the hollow resin particles are both negatively charged, and thus the titanium oxide particles and the hollow resin particles repel each other in the ink composition, suppressing aggregation of the particles and easily providing the complex with less gaps between the particles.

Advantageous Effects

According to at least one embodiment of the present invention, an ink composition having preferable masking ability and dispersion stability is provided.

DETAILED DESCRIPTION

Some embodiments of the present invention are hereinafter described by referring to the figures attached hereto. It should be noted that specific contents described as embodiments or illustrated in the figures do not intend to limit the scope of the present invention, but merely provide descriptive examples.

Figure 1:
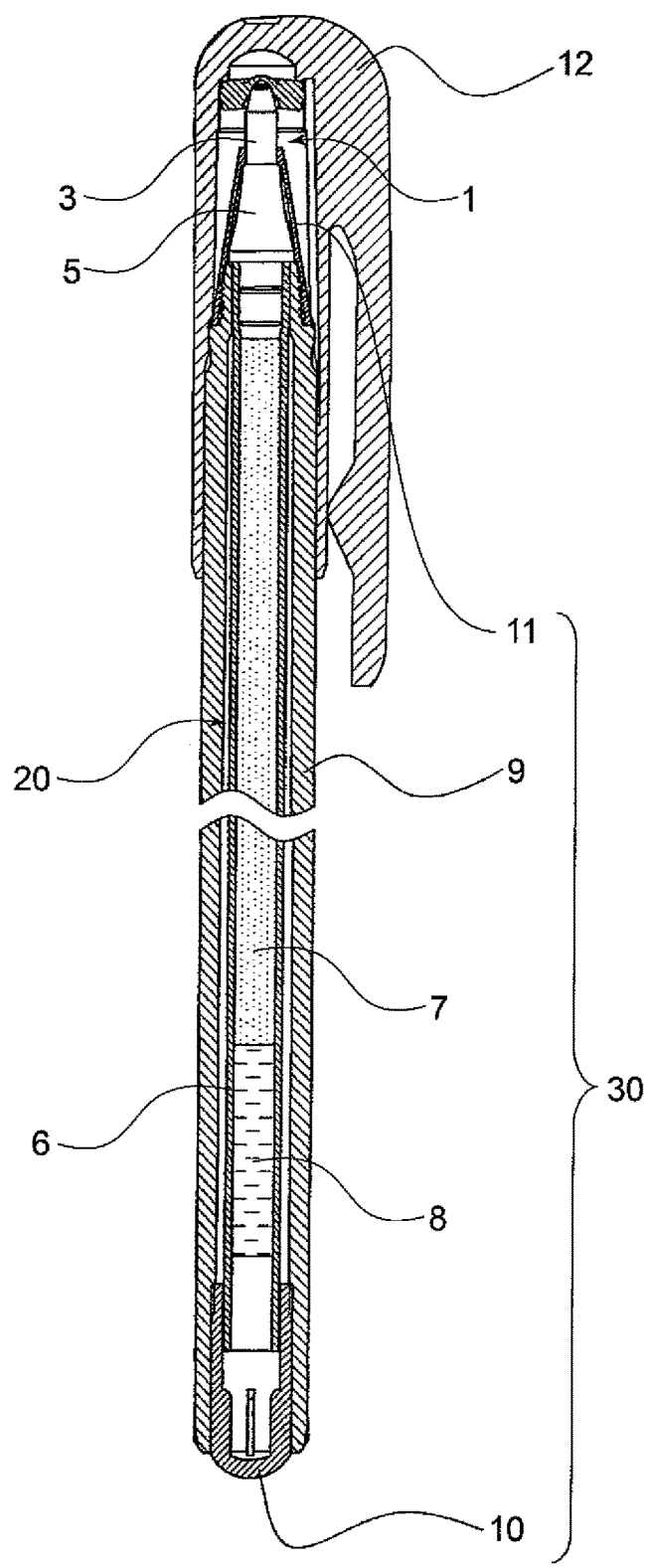
FIG. 1 is a vertical sectional view illustrating a writing tool according to one embodiment.
Figure 2:
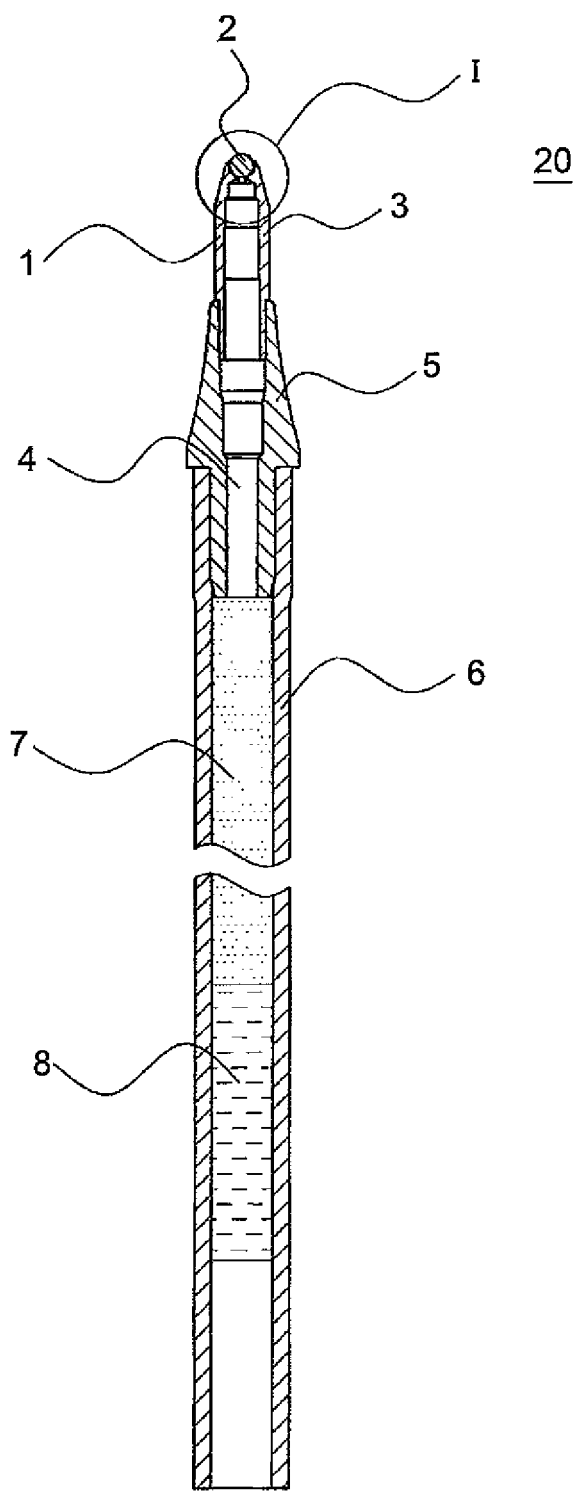
FIG. 2 is a vertical sectional view illustrating a refill used for the writing tool illustrated in FIG. 1.

FIG. 1 is a vertical sectional view illustrating a writing tool according to one embodiment. FIG. 2 is a vertical sectional view illustrating a refill portion of the writing tool illustrated in FIG. 1.

As illustrated in FIG. 1 and FIG. 2, a writing tool 100 contains a writing section which is a ballpoint pen tip 1 and an ink storage section which is an ink storage tube 6 in which ink 7 to be supplied to the ballpoint pen tip 1 (writing section) is retained.

In the embodiment illustrated in FIGS. 1 and 2, the writing tool 100 is a ballpoint pen. However, the writing tool 100 according to other embodiments is not particularly limited as far as the writing tool has a structure that allows drawing, and may be any writing tool such as a brush pen or a marker pen. The ink 7 is an ink for a ballpoint pen in the embodiment illustrated in FIGS. 1 and 2. However, the ink 7 according to other embodiments may be an ink for marker pens, an ink for brush pens and the like.

In the exemplary embodiment illustrated in FIG. 1 and FIG. 2, the writing tool 100 contains a refill 20 and an exterior casing 30.

As illustrated in FIG. 2, the refill 20 contains a ballpoint pen tip 1 that includes a ball 2 and a ball holder 3 rotatably holding the ball 2; and an ink storage tube 6 connected to the ballpoint pen tip 1 through a tip holder 5 having a through-hole 4 formed therein. The ball holder 3 holds the ball 2 while partially protruding from a distal opening of an ink hole formed in the ball holder 3. The ink storage tube 6 stores the ink 7 therein, and an ink backward-flow preventing agent 8 that is not compatible with the ink 7 is disposed so as to be in contact with the rear end interface of the ink 7. A ballpoint pen may be formed without an exterior casing 30 by disposing a tail plug or the like that prevents leakage of the ink 7 at a rear end of the ink storage tube 6 in the refill 20.

In the embodiment illustrated in FIG. 1, the exterior casing 30 contains a shaft tube 9, a tail plug 10 that is press-fitted to a rear end of the shaft tube 9 and a tip metal 11 that is screwed at a front end of the shaft tube 9. The shaft tube 9 and the tail plug 10 both have circular ribs formed thereon and are mutually fixed by press-fitting by means of the ribs.

The shaft tube 9 may be made of a transparent resin material (such as an acrylic styrene resin) and the tail plug 10 may be made of a polyethylene resin. The tip metal 11 may be made of brass and the tip metal 11 may be subjected to nickel plating or electrolytic chromate treatment.

Figure 3:
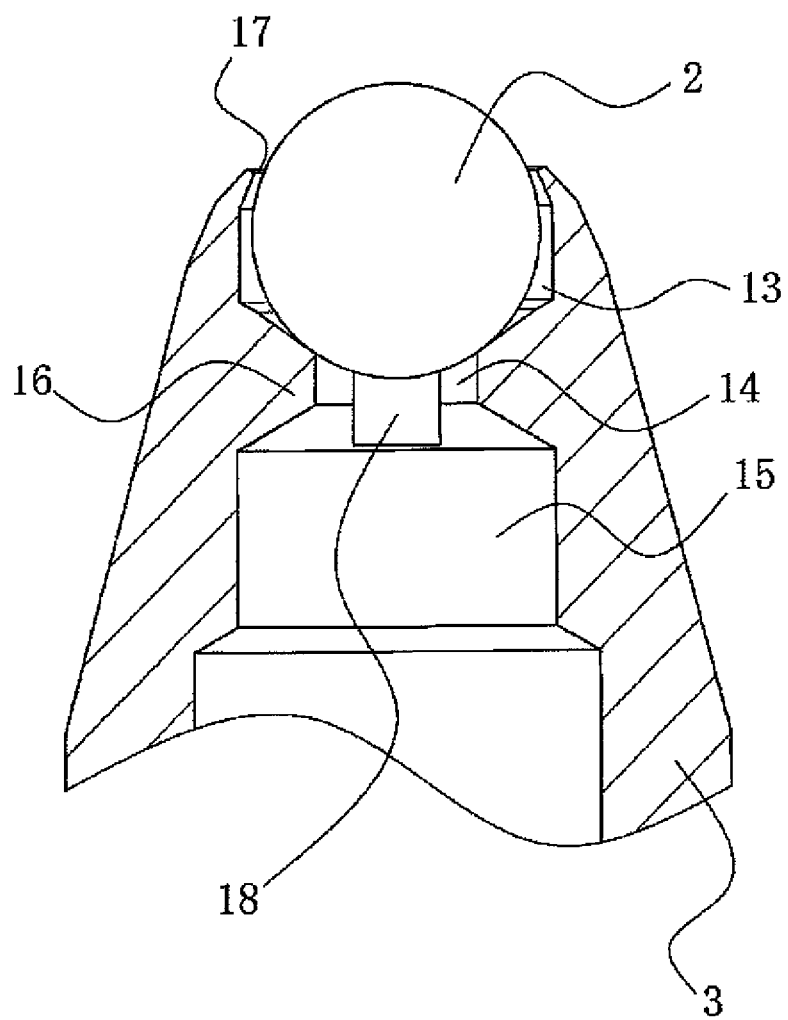
FIG. 3 is a grossly enlarged sectional view illustrating I part in FIG. 2.

FIG. 3 illustrates the structure of the ballpoint pen tip 1 in the refill 20 according to one embodiment and is a grossly enlarged vertical sectional view of I part in FIG. 2.

In an exemplary embodiment illustrated in FIG. 3, the ball holder 3 has a through-hole formed as an ink passage on a cylindrical material made of metal by using a drill or the like, and has a ball house section 13 (which is a space for rotatably holding the ball 2 formed in the ball holder 3), a middle hole 14 and a rear hole 15 in this order from the distal side. An inward projection 16 is formed between the ball house section 13 and the rear hole 15. A distal opening 17 of the ball house section 13 has a diameter that is reduced by caulking, and the distal opening 17 having a reduced diameter and the inward projection 16 define the region where the ball 2 can move from back to front and from side to side. By annularly disposing a plurality of inward projections 16 at regular intervals, a radial groove 18 through which the ink 7 passes is formed between the inward projection 16 and a neighbouring inward projection. The radial groove 18 is formed by cutting after processing the ball house section 13, the middle hole 14 and the rear hole 15. The radial groove 18 penetrates the inward projection 16 and communicates to the rear hole 15, thereby securing the supply of the ink 7 to the ball house section 13.

A coil spring may be disposed behind the ball 2 to press the ball 2 to an internal edge of the distal opening of the inner ball holder 3, thereby sealing the ink hole in no use to prevent leakage of ink from the distal end of the ballpoint pen tip or preventing movement of the ink at the time of receiving an impact by dropping or leaving a writing tool with the nib facing upwards. The load of the coil spring pressing the ball 2 is desirably 0.01 N or more and 1.50 N or less.

A cap type writing tool 100 having a cap 12 has been described hereinabove as an example of the writing tool. However, the writing tool according to some embodiments may be a retractable writing tool containing a ballpoint pen refill in a shaft tube that is configured to retractably have a tip from a distal hole. Alternatively, the writing tool according to some embodiments may be a writing tool configured to assist discharge of the ink composition during writing by pressure from compressed gas or the like.

In the ballpoint pen tip 1 according to some embodiments, a distal opening gap width C (see FIG. 4) which is a magnitude of a gap between the ball holder 3 and the ball 2 at a distal portion of the ball holder 3 may be 0.020 mm or more and 0.035 mm or less.

In the ballpoint pen tip 1 according to some embodiments, a back and forth direction ball displacement E (see FIG. 4) may be 0.050 mm or more and 0.120 mm or less, wherein the back and forth direction ball displacement is a movable distance of the ball 2 in a longitudinal direction of the ballpoint pen (writing tool 100), the ball 2 being in a state held by the ball holder 3.

In the ballpoint pen tip 1 according to some embodiments, a ball house section diameter F (see FIG. 6) may be 103% or more and 108% or less of a ball diameter, wherein the ball house section diameter is a maximum diameter of the ball house section 13.

In the ballpoint pen tip 1 according to some embodiments, a radial groove width K (see FIG. 6) may be 0.100 mm or more and 0.330 mm or less, wherein the radial groove width is a width of a radial groove 18 (see FIG. 4) radially formed in the ball holder 3 so that the ball house section 13 and the ink storage tube 6 (ink storage section) are communicated with each other.

In some embodiments, the ink 7 is formed with an aqueous ink composition containing titanium oxide particles having an average particle size of 0.1 µm or more and 0.4 µm or less, hollow resin particles having an average particle size of 1.0 µm or more and 2.0 µm or less, a polysaccharide and water. The titanium oxide particles and the hollow resin particles are negatively charged.

The hollow resin particles have a hollow structure, and thus light entering the hollow resin particles is reflected at a boundary between a resin that forms the hollow resin particles and a dispersion medium (water) and at a boundary between the resin and a void (air) in the hollow resin particles. Therefore, the hollow resin particles may easily scatter light compared to solid resin particles. Because of this, the hollow resin particles may appear to be white and have a masking effect. Resins generally have lower specific gravity than titanium oxide particles and hollow resin particles have a hollow structure with voids, and thus the hollow resin particles have a significantly lower specific gravity than titanium oxide particles.

In this regard, in the ink composition according to the above embodiment, the titanium oxide particles and the hollow resin particles are captured in the network structure of the polysaccharide, and a complex containing the polysaccharide, the titanium oxide particles and the hollow resin particles is formed. Therefore, the complex as a whole has a specific gravity that is lower than that of the titanium oxide particles, and thus the ink composition may have increased dispersion stability (namely, the ink composition has dispersibility that may hardly decrease over time).

When the ink composition contains titanium oxide particles having an average particle size of 0.1 µm or more and 0.4 µm or less and hollow resin particles having an average particle size of 1.0 µm or more and 2.0 µm or less, the hollow resin particles have an appropriate size relative to the titanium oxide particles (such as primary particles or clustered secondary particles), and thus the titanium oxide particles can efficiently enter the gaps between the hollow resin particles in the ink composition, thereby forming a complex with high density. Therefore, the ink composition may have increased dispersion stability while having preferable masking ability imparted thereto. As used herein, the average particle size of the titanium oxide particles means the average particle size of primary particles of the titanium oxide particles. The average particle size of titanium oxide is a median diameter calculated from number based particle size distribution determined from an image captured by electron microscopy (S-4800, manufactured by Hitachi High-Technologies Corporation, magnification at measurement: 10000) on an image analyser (Luzex IIIU, manufactured by Nireco Corporation).

When hollow resin particles and titanium oxide particles form significantly larger aggregates than secondary particles in an ink composition, it is difficult to obtain the complex with high density even if the hollow resin particles are configured to have an appropriate particle size relative to the titanium oxide particles. In this regard, in case of the ink composition comprising the titanium oxide particles and the hollow resin particles that are both negatively charged, the titanium oxide particles and the hollow resin particles repel each other in the ink composition, suppressing aggregation of the particles and easily providing the complex with high density.

The titanium oxide particles are a white colouring material that has masking ability even on dark coloured paper, and in some embodiments, are captured in a network structure of the polysaccharide and form a complex together with the polysaccharide and the hollow resin particles.

When the titanium oxide particles have an average particle size of 0.1 μm or more, transmission of light may be suppressed and light may be easily reflected on the surface of the titanium oxide particles, thereby allowing easy development of white colour. When the titanium oxide particles have an average particle size of 0.4 μM or less, the frequency of light reflection on the surface of the titanium oxide particles is not too low, thereby allowing easy development of white colour. Therefore, when the titanium oxide particles have an average particle size of 0.1 μm or more and 0.4 μm or less, white colour may be preferably developed and the ink composition may have preferable masking ability imparted thereto.

Specific examples of the titanium oxide particles that have an average particle size of 0.1 μm or more and 0.4 μm or less and are negatively charged in the ink composition include R-3L (oil absorption: 21 g or more and 24 g or less/100 g), R-7E (oil absorption: 27 g or more and 31 g or less/100 g) and R-24 (oil absorption: 21 g or more and 24 g or less/100 g) (all of which are manufactured by Sakai Chemical Industry Co., Ltd.); TIPAQUE R-550 (oil absorption: 23 g/100 g), TIPAQLTE R-780 (oil absorption: 33 g/100 g), TIPAQUE R-780-2 (oil absorption: 40 g/100 g), TIPAQUE R-820 (oil absorption: 24 g/100 g), TIPAQUE R-830 (oil absorption: 21 g/100 g), TIPAQUE S-305 (oil absorption: 23 g/100 g), TIPAQUE CR-85 (oil absorption: 30 g/100 g), TIPAQUE CR-90 (oil absorption 21 g/100 g) and TIPAQUE A-100 (oil absorption: 22 g/100 g) (all of which are manufactured by Ishihara Sangyo Kaisha, Ltd.); KRONOS KR-310 (oil absorption: 17 g or more and 22 g or less/100 g), KRONOS KA-10 (oil absorption: 18 g or more and 28 g or less/100 g), KRONOS KA-15 (oil absorption: 19 g or more and 24 g or less/100 g) and KRONOS KA-30 (oil absorption: 18 g or more and 23 g or less/100 g) (all of which are manufactured by Titan Kogyo, Ltd.); TITANIX JR-800 (oil absorption: 29 g/100 g), TITANIX JR-801 (oil absorption: 40 g/100 g), TITANIX JR-805 (oil absorption: 22 g/100 g), TITANIX JR-806 (oil absorption: 21 g/100 g), TITANIX JRNC (oil absorption 21 g/100 g), TITANIX JR (oil absorption: 18 g/100 g), TITANIX JA-1 (oil absorption: 23 g/100 g), TITANIX JA-C (oil absorption: 23 g/100 g) and TITANIX JA-3 (oil absorption 23 g/100 g) (all of which are manufactured by Tayca Corporation); TA-100 (oil absorption: 22 g/100 g), TA-200 (oil absorption: 24 g/100 g) and TA-300 (oil absorption: 21 g/100 g) (all of which are manufactured by Fuji Titanium Industry, Co., Ltd.); and the like.

There are generally rutile-type and anatase-type titanium oxide particles, and rutile-type titanium oxide particles have an isoelectric point at pH 5.6 and anatase-type titanium oxide particles have an isoelectric point at pH 6.1. When a dispersion of titanium oxide particles has a higher pH than the isoelectric point of the titanium oxide particles, the titanium oxide particles are negatively charged. In order to improve dispersibility of the titanium oxide particles, it is known to treat the surface of titanium oxide particles with an oxide. Typical examples of the surface treatment agent of titanium oxide particles include $SiO_2$, $Al_2O_3$ and ZnO of which isoelectric points are $SiO_2$ (α Quartz: pH 2.5, colloidal silica: pH 2.0), $Al_2O_3$ (α alumina: pH 9.0, γ alumina: 8.0) and ZnO (pH 9.3). One of the surface treatment agents may be used or two or more thereof may be mixed and used.

When titanium oxide particles are subjected to surface treatment with one surface treatment agent, the isoelectric point at the surface of the titanium oxide particles approaches the isoelectric point of the surface treatment agent. When titanium oxide particles are subjected to surface treatment with two or more surface treatment agents, the isoelectric point at the surface of the titanium oxide particles varies according to a mixing ratio of the surface treatment agents. For example, when surface treatment agents $SiO_2$ and $Al_2O_3$ are used in combination, the isoelectric point at the surface of the titanium oxide particles approaches the isoelectric point of $Al_2O_3$ when more $Al_2O_3$ exists than $SiO_2$ at the surface of the titanium oxide particles. Meanwhile, the isoelectric point at the surface of the titanium oxide particles approaches the isoelectric point of $SiO_2$ when more $SiO_2$ exists than $Al_2O_3$ at the surface of the titanium oxide particles.

The oil absorption/water absorption of titanium oxide particles also varies according to a mixing ratio of surface treatment agents used for surface treatment of the titanium oxide particles. For example, when surface treatment agents $SiO_2$ and $Al_2O_3$ are used in combination for the surface treatment of titanium oxide particles, the oil absorption of the titanium oxide particles decreases and the water absorption increases when more $Al_2O_3$ exists than $SiO_2$ at the surface of the titanium oxide particles. Meanwhile, the oil absorption of the titanium oxide particles increases and the water absorption decreases when more $SiO_2$ exists than $Al_2O_3$ at the surface of the titanium oxide particles.

In order to increase the dispersion efficiency of titanium oxide particles and thus increase handling and productivity, commercially available water-dispersed titanium oxide particles are preferably used. Specific examples of water-dispersed titanium oxide particles include Fuji SP White #143 (oil absorption: 33 g/100 g, titanium oxide particle concentration: 50.0 wt %), Fuji SP White #383 (oil absorption: 33 g/100 g, titanium oxide particle concentration: 50.0 wt %), Fuji SP White #552 (oil absorption: 17 g/100 g, titanium oxide particle concentration: 50.0 wt %), Fuji SP White #553 (oil absorption: 14 g/100 g, titanium oxide particle concentration: 50.0 wt %), Fuji SP White #791 (oil absorption: 40 g/100 g, titanium oxide particle concentration: 50.0 wt %) and Fuji SP White #1186 (oil absorption: 33 g/100 g, titanium oxide particle concentration: 50.0 wt %); and the like.

Particularly, titanium oxide particles having an oil absorption of 29 g/100 g or more and 35 g/100 g or less may be preferably used. It is believed that the titanium oxide particles having an oil absorption of 29 g/100 g or more and 35 g/100 g or less are bulky and have more pores on the surface thereof, and thus promote generation of the complex and provide effects of prevention of air entrainment and prevention of chattering noise in some embodiments.

The oil absorption as used herein is the amount (in grams) of boiled linseed oil added converted for 100 g of titanium oxide particles when a mixture of boiled linseed oil and titanium oxide particles becomes like putty and has moldability after placing 2 g of titanium oxide particles on a glass plate, gradually adding boiled linseed oil dropwise and thoroughly mixing thereof with a metal spatula.

The ink composition preferably contains titanium oxide particles suitably at 5.0 wt % or more and 40.0 wt % or less and more preferably more than 5.0 wt % and less than 20.0 wt % relative to the total amount of the ink composition. When the content of the titanium oxide particles is less than 5.0 wt %, the writing line may be too faint to be observed. When the content is above 40.0 wt %, the amount of solid matters increases and starving may occur in the writing line over time.

The hollow resin particles (of which details are described hereinafter) used in combination with the titanium oxide particles have relatively low development of white colour when attached to an object of drawing (such as a plane of paper) as an ink composition before being dried, and some time is required until a white writing line can be visibly observed. In this regard, inclusion of the titanium oxide particles at 5.0 wt % or more may develop a preferable white colour within a relatively short time and exhibit masking ability when the ink composition is attached to an object of drawing.

The hollow resin particles having an average particle size of 1.0 μm or more and 2.0 μm or less according to some embodiments can be dispersed in water in the state of solids and have outer shells formed with a resin and inner voids. In some embodiments, the hollow resin particles are captured in a network structure of the polysaccharide and form a complex with the polysaccharide and the titanium oxide particles.

When the hollow resin particles have an average particle size of 1.0 μm or more, the hollow resin particles do not precipitate in an object of drawing and may be retained on the surface of the object of drawing when the ink composition is attached to the object of drawing such as a plane of paper. When the hollow resin particles have an average particle size of 2.0 μm or less, light may be more frequently refracted and may be easily diffused and reflected, thereby providing preferable development of white colour. Therefore, when the hollow resin particles have an average particle size of 1.0 μm or more and 2.0 μm or less, preferable masking ability may be exhibited.

The hollow resin particles may be formed from at least one of polyethylene, polypropylene, vinyl chloride, polymethacrylate, benzoguanamine, nylon, styrene-butadiene copolymers, styrene-acrylonitrile copolymers, styrene-acrylic copolymers and silicone resins.

Particularly, the hollow resin particles formed from a styrene-acrylic copolymer have, although the particles are not deformed by writing, an appropriate elasticity and thus a cushioning effect, form a network structure and a cross-linked structure, interact with the polysaccharide and a silicone active agent exhibiting both plastic deformation and elastic deformation, and can form a complex that may more easily undergo elastic deformation. Therefore, a preferable effect of relaxing an impact can be obtained when a ballpoint pen is dropped.

The shape of the hollow resin particles may be spherical, crushed, flat or doughnut-shaped.

The hollow resin particles have small voids in the resin particles. Because of voids, the resin particles can preferably scatter light and can impart masking ability, opacity and white colour.

The hollow resin particles used which have an average particle size of 1.0 μm or more and 2.0 μm or less and are negatively charged in the ink composition may be commercially available. Specific examples thereof include ROPAQUE SN-1055 (average particle size: 1.0 μm) and HP-1055 (average particle size: 1.0 μm) (manufactured by Rohm and Haas Japan KK).

The material of the hollow resin particles is particularly preferably a styrene-acrylic copolymer having an appropriate elasticity and high cushioning effect. Specific examples thereof include ROPAQUE SN-1055 and HP-1055.

The hollow resin particles used in combination with the titanium oxide particles, the polysaccharide or a silicone active agent described hereinafter may form a complex having mild composite bonding of combination of hydrophobic bonds and hydrogen bonds. Therefore, the writing line has a preferable masking effect, chattering noise during writing or starving due to clogging may be prevented and smooth writing may be possible immediately after a pen is dropped. The hollow resin particles have inner voids, and thus have high cushioning effect and an effect of relaxing an impact.

Particularly, the hollow resin particles having a voidage of 50% or more are preferable. In this case, the hollow resin particles may easily form a complex with the polysaccharide and the titanium oxide particles in the ink composition and may provide sufficient cushioning effect. Therefore, the hollow resin particles are less affected by an impact during passage of an ink between a receiving seat and a ball or movement of a ball during occurrence of chattering noise, thereby providing preferable writing performance.

The average particle size of the hollow resin particles as used herein is an average particle size (volume average diameter) based on volume-based distribution determined on a nano particle size distribution analyser SALD-7100 (laser diffraction) manufactured by Shimadzu Corporation.

One type of the hollow resin particles may be used or two or more types thereof may be mixed and used.

The ink composition preferably contains the hollow resin particles at 5.0 wt % or more and 20.0 wt % or less relative to the total amount of the ink composition. The ratio of the average particle size between the hollow resin particles and the titanium oxide particles is particularly preferably in the range of 1.0:0.40 to 1.0:0.16. By configuring the average particle size of the titanium oxide particles relative to the average particle size of the hollow resin particles to be 1.0:0.40 or less, the hollow resin particles serve as a spacer in the gap between a ball and a ball holder when, for example, the ink composition is used for a ballpoint pen. Because of this, a possibility of inhibition of rotation of the ball due to the titanium oxide particles directly sandwiched between metals may be further reduced, and an effect of preventing chattering noise may be further increased.

The polysaccharide per se forms a network structure in the ink composition and forms a complex together with the titanium oxide particles and the hollow resin particles.

Specific examples of the polysaccharide include pullulan, xanthan gum, welan gum, gellan gum, rhamsan gum, starch, cationic starch, dextrin, sodium starch glycolate and derivatives thereof, gum arabic, gum tragacanth, locust bean gum, guar gum and derivatives thereof, agar, carrageenan, alginic acid, alginate salts, pectin, gelatin, casein, casein sodium, glucomannnan, dextran, methylcellulose, ethylcellulose, hydroxyethylcellulose, carboxymethylcellulose, hydroxypropylcellulose, sodium starch glycolate, lanolin derivatives, chitosan derivatives and the like.

One of the polysaccharides may be used or two or more thereof may be mixed and used.

Among the polysaccharides, xanthan gum may be particularly preferably used. A xanthan gum aqueous solution has high elasticity due to interaction with the titanium oxide particles and the hollow resin particles, and has high effects of relaxing an impact and preventing chattering noise.

Specific examples of xanthan gum include KELZAN, KELZAN S, KELZAN F, KELZAN AR, KELZAN M and KELZAN D (all of which are manufactured by Sansho Co., Ltd.), KOHJIN, KOHJIN F, KOHJIN T and KOHJIN K (all of which are manufactured by Kohjin Co., Ltd.), NOCCOAT (manufactured by Nisshin Oil Mills, Ltd.), INAGEL V-7 and INAGEL V-7T (all of which are manufactured by Ina Food Industry Co., Ltd.) and the like.

The ink composition contains the polysaccharide preferably at 0.1 wt % or more and 5.0 wt % or less relative to the total amount of the ink composition.

Water serves as a dispersion medium for dispersing the titanium oxide particles, the hollow resin particles and the polysaccharide in the ink composition.

In some embodiments, the ink composition may contain a surfactant.

Hydrophilic groups of the surfactant interact with hydrophilic groups of the polysaccharide, and hydrophobic groups of the surfactant interact with hydrophobic groups of the titanium oxide particles and resin particles such as the hollow resin particles. Because of this, the surfactant serves as a binder for binding the polysaccharide having a network structure and the titanium oxide particles or the hollow resin particles. Therefore, when the ink composition contains a surfactant, a complex in which a network structure of the polysaccharide binds to a cross-linked structure of the surfactant containing the titanium oxide particles or the hollow resin particles can be formed. Because of this, the network structure of the complex may be stabilized and the titanium oxide particles and the hollow resin particles may have increased dispersion stability.

The surfactant may contain a silicone active agent.

When the surfactant contains a silicone active agent, a complex formed from the polysaccharide, the titanium oxide particles and the like and the silicone active agent has steric hinderance having the polysiloxane structure and forms inter-adsorption including physisorption and chemisorption. Therefore, when a writing tool receives an impact at the time of dropping and the like, flexible plastic deformation and elastic shape restoration occur, and thus the impact may be effectively relaxed and a preferable flowability of the ink composition may be maintained.

The silicone active agent may be any silicone active agent without particular limitation, and examples thereof that may be used include dimethyl silicone, polyether-modified silicone, methyl phenyl silicone, alkyl-modified silicone, higher fatty acid-modified silicone, methyl hydrogen silicone, fluorine-modified silicone, epoxy-modified silicone, carboxy-modified silicone, carbinol-modified silicone, amino-modified silicone and the like.

Examples of commercially available silicone active agents that may be preferably used include, as the oil-type, FA-630, X-50-1039A and KS-7708 (all of which are manufactured by Shin-Etsu Chemical Co., Ltd.), YSA6403 (manufactured by Momentive Performance Materials Japan LLC.), BYK-019 and BYK-025 (both of which are manufactured by BYK Japan KK); as the compound-type, KS-66, KS-69 and X-50-11050 (all of which are manufactured by Shin-Etsu Chemical Co., Ltd.), TSA750 and TSA750S (both of which are manufactured by Shin-Etsu Chemical Co., Ltd.), BYK-017 and BYK094 (both of which are manufactured by BYK Japan KK); as the self-emulsifying type, KS-508, KS-530, KS-531, KS-537, KS-538 and KS-540 (all of which are manufactured by Shin-Etsu Chemical Co., Ltd.), YSA6406 and TSA780 (all of which are manufactured by Momentive Performance Materials Japan LLC), BYK1770 (manufactured by BYK Japan KK); as the emulsion-type, KM70, KM-71, KM-72, KM-72F, KM-72S, KM72GS, KM72FS, KM-73, KM-73A, KM-73E, KM-75, KM-85, KM-89, KM-90, KM-98, KM7750 and KM-7752 (all of which are manufactured by Shin-Etsu Chemical Co., Ltd.), TSA7341, TSA730, TSA732, TSA732A, TSA737, TSA737F, TSA739, TSA770, TSA772, TSA775 and YMA6509 (all of which are manufactured by Momentive Performance Materials Japan LLC), BYK-023, YK-044, BYK-1615 and BYK1650 (all of which are manufactured by BYK Japan KK); as the mineral oil mixture-type, BYK-035, BYK037 and BYK-038 (all of which are manufactured by BYK Japan KK); and the like.

One of the silicone active agents may be used or two or more thereof may be mixed and used.

The ink composition contains the silicone active agent preferably at 0.1 wt % or more and 5.0 wt % or less relative to the total amount of the ink composition. The silicone active agent has low surface tension and has an effect of entering and expanding pores. Therefore, it is believed that an ink binder containing the silicone active agent enters pores on the surface of the hollow resin particles and the titanium oxide particles having an oil absorption of 29 g/100 g or more and 35 g/100 g or less and promotes expansion thereof, thereby increasing formation of the complex.

Among others, the emulsion-type and mineral oil-mixed type silicone active agents are suitably used because the lipophilic-hydrophilic moieties of the silicone active agents bind to lipophilic moieties of resin particles and hydrophilic moieties of the polysaccharide in a balanced manner to allow the complex to serve as a lubricant between a ball and a metal plane of a ball holder, thereby allowing smooth rotation of the ball, prevention of chattering noise, good ink flow and an improvement of writing performance.

In some embodiments, the ink composition may contain a film-forming resin.

The film-forming resin may be used for the purpose of forming a film on the writing line (such as titanium oxide particles) of the ink composition when a dispersion medium (liquid) is evaporated during formation of the writing line of the ink composition.

When the ink composition contains a film-forming resin, the film-forming resin adsorbs to the titanium oxide particles or the hollow resin particles to contribute to steric hinderance and improves dispersion stability of the titanium oxide particles or the hollow resin particles. Therefore, when the ink composition contains a film-forming resin, the ink composition may have more improved dispersion stability.

The film-forming resin may have an effect of forming a film by evaporation of a liquid medium and may contribute to dispersion stability of a viscosity controlling agent, a fixing agent on a plane where writing happens and a pigment.

Specific examples of the film-forming resin include water-soluble synthetic polymers such as polyvinyl alcohol, poly(vinyl ether), polyvinylpyrrolidone, poly(vinyl alkyl ether), poly(vinyl chloride), poly(vinyl acetate), poly(sodium acrylate), polyacrylamide, polyamide, poly(ethylene oxide), poly(methyl acrylate), poly(methyl methacrylate), polytetrafluoroethylene, polypropylene, polybutene, polybutadiene, polymethylpentene, poly(styrene-butadiene), polyethylene, polystyrene, polyacrylic resins, poly(sodium acrylate), polyester, polyester polyol resins, polyester polyether resins, polyethylene terephthalate, polybutylene terephthalate, alkyl acid-alkyl methacrylate copolymers and salts thereof, styrene-maleic acid copolymers and salts thereof, styrene-acrylic acid copolymers and salts thereof, methylstyrene-acrylic acid copolymers and salts thereof, acrylonitrile butadiene styrene resins, ethylene-tetrafluoroethylene copolymers and salts thereof, acrylic emulsions, vinyl acetate emulsions, epoxy resins, coumarone-indene resins, rosin-modified maleic acid, rosin resins and hydrogenated products thereof, ketone resins, sulphoamide resins, ester gum, xylene resins, phenol resins, alkyl phenol resins, terpene phenol resins, terpene resins, hydroxyethylcellulose, hydroxypropyl cellulose, hydroxypropyl methylcellulose, hydroxyethyl methylcellulose, carboxymethylcellulose, methylcellulose, ethylcellulose, cellulose and derivatives thereof.

Particularly, the film-forming resin such as an acrylic resin and a polyester resin is anionic and thus is negatively charged. Therefore, the film-forming resin forms a negatively-charged film at a gas-liquid interface and a solid-liquid interface in the ink composition. The negatively-charged titanium oxide particles or negatively-charged hollow resin particles and a film made of the negatively-charged film-forming resin at a gas-liquid interface and a solid-liquid interface repel each other, and thus the film-forming resin may further increase dispersion stability of the ink composition.

Specific preferable examples of the negatively-charged film-forming resin which are preferable include acrylic resins including Joncryl 52J, Joncryl 57J, Joncryl 60J, Joncryl 61J, Joncryl 63J, Joncryl 70J, Joncryl PDX-6180, Joncryl HPD-196, Joncryl HPD-96J, Joncryl PDX-6137A, Joncryl 6610, Joncryl JDX-6500, Joncryl PDX-6102B, Joncryl PDX-6124, Joncryl 7100, Joncryl 711, Joncryl PDX-7370, Joncryl PDX-7323, Joncryl PDX-7611, Joncryl 352D, Joncryl 538J, Joncryl PDX-7700 and Joncryl FDX-7177 (all of which are manufactured by BASF, Germany).

Further examples include polyester resins including PLAS COAT Z-221, PLAS COAT Z-446, PLAS COAT Z-561, PLAS COAT. Z-565, PLAS COAT Z-880, PLAS COAT Z-3310, PLAS COAT RZ-105, PLAS COAT RZ-570, PLAS COAT Z-730, PLAS COAT Z-760, PLAS COAT Z-592, PLAS COAT Z-687, PLAS COAT Z-690 and PLAS COAT Z-1100 (all of which are manufactured by Goo Chemical Co., Ltd.), WATERSOL S-118, WATERSOL S-144, WATERSOL CD-520P, WATERSOL BCD-3090, WATERSOL S-346, WATERSOL BCD-3040, WATERSOL BCD-3050, WATERSOL BC-3010, WATERSOL CD-550LAP, WATERSOL BM-1000P, WATERSOL EFD-5501P, WATERSOL EFD-5530, WATERSOL EFD-5560, WATERSOL EFD-5570 and WATERSOL EFD-5580 (all of which are manufactured by DIC Corporation) and PAOGEN PP-15 and PAOGEN EP-15 (both of which are manufactured by DKS Co., Ltd.).

The ink composition contains the film-forming resin preferably at 0.1 wt % or more and 40.0 wt % or less relative to the total amount of the ink composition.

A polyester resin is insoluble in water and dispersed in the form of an aqueous emulsion in an aqueous ink, and thus hydrophilic groups thereof face liquid at an interface of a liquid layer and a gas layer, hydrophobic moieties contact the gas layer and the polyester resin forms a composite resin film together with the complex during drying. The composite resin film is a polyester film having a cushioning effect and elasticity due to interaction between the titanium oxide particles, resin particles having an average particle size of 1.0 µm or more and 2.0 µm or less, the polysaccharide, the silicone active agent and the film-forming resin, and thus has a high effect of relaxing an impact when a ballpoint pen is dropped.

The polyester resin is preferably a saturated polyester without unsaturated bond in a molecular main chain because the molecular chain without unsaturated bond in the molecular main chain of the polyester resin can move freely, forming a flexible composite resin film and further increasing the cushioning effect of the composite complex formed in the present invention.

In some embodiments, the ink composition may further contain a colouring material. In this case, the ink composition having a preferable masking effect and dispersion stability may be toned.

The colouring material may be at least one selected from water-soluble dyes, oil-soluble dyes, pigments, resin particles coloured with a dye or the like, metal powder pigments and the like. These colouring materials may be used in combination.

Examples of the water-soluble dye that may be used include acid dyes, direct dyes, basic dyes and the like.

Specific examples of the direct dye include C.I. Direct Black 17, CI. Direct Black 19, C.I. Direct Black 22, C.I. Direct Black 32, C.I. Direct Black 38, C.I. Direct Black 51, C.I. Direct Black 71, C.I. Direct Yellow 4, C.I. Direct Yellow 26, C.I. Direct Yellow 44, C.I. Direct Yellow 50, C.I. Direct Red 1, C.I. Direct Red 4, C.I. Direct Red 23, C.I. Direct Red 31, C.I. Direct Red 37, C.I. Direct Red 39, C.I. Direct Red 75, C.I. Direct Red 80, C.I. Direct Red 81, C.I. Direct Red 83, C.I. Direct Red 225, C.I. Direct Red 226, C.I. Direct Red 227, C.I. Direct Blue 1, C.I. Direct Blue 15, C.I. Direct Blue 71, C.I. Direct Blue 86, C.I. Direct Blue 106, C.I. Direct Blue 199 and the like.

Specific examples of the acid dye include C.I. Acid Black 1, C.I. Acid Black 2, C.I. Acid Black 24, C.I. Acid Black 26, C.I. Acid Black 31, C.I. Acid Black 52, C.I. Acid Black 107, C.I. Acid Black 109, C.I. Acid Black 110, C.I. Acid Black 119, C.I. Acid Black 154, C.I. Acid Yellow 7:1, C.I. Acid Yellow 17, C.I. Acid Yellow 19, C.I. Acid Yellow 23, C.I. Acid Yellow 25, C.I. Acid Yellow 29, C.I. Acid Yellow 38, C.I. Acid Yellow 42, C.I. Acid Yellow 49, C.I. Acid Yellow 61, C.I. Acid Yellow 72, C.I. Acid Yellow 78, C.I. Acid Yellow 110, C.I. Acid Yellow 127, C.I. Acid Yellow 135, C.I. Acid Yellow 141, C.I. Acid Yellow 142, C.I. Acid Red 8, C.I. Acid Red 9, C.I. Acid Red 14, C.I. Acid Red 18, C.I. Acid Red 26, C.I. Acid Red 27, C.I. Acid Red 35, C.I. Acid Red 37, C.I. Acid Red 51, C.I. Acid Red 52, C.I. Acid Red 57, C.I. Acid Red 82, C.I. Acid Red 87, C.I. Acid Red 92, C.I. Acid Red 94, C.I. Acid Red 111, C.I. Acid Red 129, C.I. Acid Red 131, C.I. Acid Red 138, C.I. Acid Red 186, C.I. Acid Red 249, C.I. Acid Red 254, C.I. Acid Red 265, C.I.

Acid Red 276, C.I. Acid Violet 15, C.I. Acid Violet 17, C.I. Acid Blue 1, C.I. Acid Blue 1, C.I. Acid Blue 7, C.I. Acid Blue 9, C.I. Acid Blue 15, C.I. Acid Blue 22, C.I. Acid Blue 23, C.I. Acid Blue 25, C.I. Acid Blue 40, C.I. Acid Blue 41, C.I. Acid Blue 43, C.I. Acid Blue 62, C.I. Acid Blue 78, C.I. Acid Blue 83, C.I. Acid Blue 90, C.I. Acid Blue 93, C.I. Acid Blue 103, C.I. Acid Blue 112, C.I. Acid Blue 113, C.I. Acid Blue 158, C.I. Acid Green 3, C.I. Acid Green 9, C.I. Acid Green 16, C.I. Acid Green 25, C.I. Acid Green 27 and the like.

Specific examples of the basic dye include C.I. Basic Yellow 11, C.I. Basic Yellow 13, C.I. Basic Yellow 15, C.I. Basic Yellow 19, C.I. Basic Yellow 21, C.I. Basic Yellow 28, C.I. Basic Yellow 51, C.I. Basic Orange 21, C.I. Basic Orange 30, C.I. Basic Red 1, C.I. Basic Red 12, C.I. Basic Red 15, C.I. Basic Red 18, C.I. Basic Red 27, C.I. Basic Red 46, C.I. Basic Violet 1, CI. Basic Violet 3, CI. Basic Violet 10, C.I. Basic Blue 1, C.I. Basic Blue 3, C.I. Basic Blue 9, C.I. Basic Blue 41, C.I. Basic Blue 54, C.I. Basic Green 1, Basic Green 4, C.I. Basic Brown 1 and the like.

Specific examples of the oil-soluble dye include C.I. 45170B (manufactured by Taoka Dyestuffs Manufacturing Co., Ltd.), C.I. 21260 (manufactured by Chugai Kasei Co., Ltd.), C.I. 42535B (manufactured by National Aniline Div., U.S.A.), C.I. 42563B and C.I. 50415 (both of which are manufactured by BASF, Germany), C.I. 13900A, C.I. 18690A, C.I. 50415, C.I. 12195, VALIFAST Yellow #1109, VALIFAST Orange #2210, VALIFAST Red #1320, VALIFAST Blue #1605, VALIFAST Violet #1701 (all of which are manufactured by Orient Chemical Industries Co., Ltd.), SPILON Black GMH special, SPILON Yellow C-2GH, SPILON yellow C-GNH, SPILON Red C-GH, SPILON Red C-BH, SPILON Blue C-RH, SPILON Violet C-RH, S.P.T. Orange 6, S.P.T. Blue 111 (all of which are manufactured by Hodogaya Chemical Co., Ltd.) and the like.

The colouring material used may be a halochromic dye between a basic dye such as C.I. Basic Blue 1, C.I. Basic Blue 7, C.I. Basic Blue 8, C.I. Basic Violet 1, C.I. Basic Violet 3 and C.I. Basic Red and an acid dye such as C.I. Acid Yellow 23 and C.I. Acid Yellow 36.

The pigment used may be at least one selected from organic pigments such as azo pigments, nitroso pigments, nitro pigments, basic dye pigments, acid dye pigments, vat dye pigments, mordant dye pigments and natural dye pigments, inorganic pigments such as ochre, barium yellow, ultramarine, iron blue, cadmium red, barium sulphate, titanium oxide particles, red iron oxide, black iron oxide and carbon black, metal powder pigments such as aluminium powder, gold powder, silver powder, copper powder, tin powder and brass powder, fluorescent pigments, mica pigments and the like.

Specific Examples of the organic pigment include C.I. 50440, Cyanine Black, C.I. 10316, C.I. 11710, C.I. 11660, C.I. 11670, C.I. 11680, C.I. 11730, C.I. 11735, C.I. 11740, C.I. 12710, C.I. 12720, C.I. 21090, C.I. 21095, C.I. 21100, C.I. 20040, C.I. 21220, C.I. 21135, C.I. 19140, C.I. 47005, C.I. 60520, Permanent Yellow FGL, Permanent Yellow H10G, Permanent Yellow HR, C.I. 68420, C.I. 12055, C.I. 12075, C.I. 12125, C.I. 12305, C.I. 11725, C.I. 21165, C.I. 21110, C.I. 15510, C.I. 59305, C.I. 59105, C.I. 71105, C.I. 12480, C.I. 12071, C.I. 12120, C.I. 12070, C.I. 12085, C.I. 12090, Lithol Fast Scarlet, C.I. 12315, Brilliant Carmine BS, C.I. 12310, C.I. 12335, C.I. 12440, C.I. 12460, C.I. 12420, Fast Scarlet VD, C.I. 12320, C.I. 12330, C.I. 12450, C.I. 12455, C.I. 12490, C.I. 12120, C.I. 15630, C.I. 15585, C.I. 15500, C.I. 18030, C.I. 15800, C.I. 15825, C.I. 15865, C.I. 15850, C.I. 16105, C.I. 12170, C.I. 12350, C.I. 12385, C.I. 14830, C.I. 15880), C.I. 15825, C.I. 15880, C.I. 45380, C.I. 45170, C.I. 45160, C.I. 58000, C.I. 73300, C.I. 73385, C.I. 12370, PV Carmine HR, Watching Red, C.I. 59300, Permanent Red BL, Fast Violet B, C.I. 42535, dioxazine violet, C.I. 42750A, C.I. 42770A, C.I. 42090, C.I. 42025, C.I. 44045, C.I. 74160, C.I. 74180, C.I. 69800, C.I. 69825, C.I. 73000, C.I. 10006, C.I. 10020, C.I. 12775 Acid Green Lake, C.I. 42000, phthalocyanine green and the like.

The inorganic pigment used may be carbon black.

Specific examples of carbon black include Mitsubishi Carbon Black #10B, Mitsubishi Carbon Black #20B, Mitsubishi Carbon Black #14, Mitsubishi Carbon Black #25, Mitsubishi Carbon Black #30, Mitsubishi Carbon Black #33, Mitsubishi Carbon Black #40, Mitsubishi Carbon Black #44, Mitsubishi Carbon Black #45, Mitsubishi Carbon Black #45L, Mitsubishi Carbon Black #50, Mitsubishi Carbon Black #55, Mitsubishi Carbon Black #95, Mitsubishi Carbon Black #260, Mitsubishi Carbon Black #900, Mitsubishi Carbon Black #1000, Mitsubishi Carbon Black #2200B, Mitsubishi Carbon Black #2300, Mitsubishi Carbon Black #2350, Mitsubishi Carbon Black #2400B, Mitsubishi Carbon Black #2650, Mitsubishi Carbon Black #2700, Mitsubishi Carbon Black #4000B, Mitsubishi Carbon Black CF9, Mitsubishi Carbon Black MA8, Mitsubishi Carbon Black MA11, Mitsubishi Carbon Black MA77, Mitsubishi Carbon Black MA100, Mitsubishi Carbon Black MA220, Mitsubishi Carbon Black MA230, Mitsubishi Carbon Black MA600 and Mitsubishi Carbon Black MCF88 (all of which are manufactured by Mitsubishi Chemical Corporation), MONARCH 120, MONARCH 700, MONARCH 800, MONARCH 880, MONARCH 1000, MONARCH 1100, MONARCH 1300, MONARCH 1400, MOGUL L, REGAL 99R, REGAL 250R, REGAL 300R, REGAL 330R, REGAL 400R, REGAL 500 and REGAL 660R (all of which are manufactured by Cabot Corporation, U.S.A.), PRINTEX A, PRINTEX G, PRINTEX U, PRINTEX V, PRINTEX 55, PRINTEX 140U, PRINTEX 140V, PRINTEX 35, PRINTEX 40, PRINTEX 45, PRINTEX 85, NINEPex 35, Special Black 4, Special Black 4A, Special Black 5, Special Black 6, Special Black 100, Special Black 250, Special Black 350, Special Black 550, Colour Black FW1, Colour Black FW2, Colour Black FW2V, Colour Black FW18, Colour Black FW200, Colour Black S150, Colour Black S160 and, Colour Black S170 (all of which are manufactured by Degussa Japan Co., Ltd.), RAVEN 5000 ULTRA II, RAVEN 2500 ULTRA, RAVEN 1250 and RAVEN 760 ULTRA (all of which are manufactured by Columbian Carbon Japan, Ltd.) and the like.

Specific examples of resin particles coloured with a dye include SF-5012, SF-5013 SF-5014, SF-5015, SF-5017, SF-5027, SF-5037, SF-5018, SF-8012, SF-8014, SF-8015, SF-8017, SF-8037 and SF-8027 (all of which are manufactured by Sinloihi Co., Ltd.), LUMICOL NKW-2101E, LUMICOL 2102E, LUMICOL 2103E, LUMICOL 2104E, LUMICOL 2105E, LUMICOL 2106E, LUMICOL 2107E, LUMICOL 2108E, LUMICOL 2117E, LUMICOL 2127E, LUMICOL 2137E, LUMICOL 2167E, LUMICOL C2102E, LUMICOL C2103E, LUMICOL C2104E, LUMICOL C2105E, LUMICOL C2108E, LUMICOL C2117E, LUMICOL C2147E, LUMICOL C2167E, LUMICOL 6200E, LUMICOL 6202E, LUMICOL 6203E, LUMICOL 6204E, LUMICOL 6205E, LUMICOL 6207E, LUMICOL 6253E, LUMICOL 6258E and LUMICOL 6277E (all of which are styrene-acrylonitrile copolymers and manufactured by Nippon Keiko Kagaku Co., Ltd.) and the like.

The metal powder pigment used may be at least one of aluminium powder, aluminium pastes, crushed fine fragments which are aluminium coated with coloured resin layers and pearl pigments.

Specific examples of commercially available aluminium powder include SUPER FINE No. 22000, SUPER FINE No. 18000, FINE No. 900 and FINE No. 800 (all of which are manufactured by Yamato Metal Powder Co., Ltd.), AA12, AA8, No. 900 and No. 18000 (all of which are manufactured by Fukuda Metal Foil & Powder Co., Ltd.), Aluminium Powder 1000 and Aluminium Powder 2700 (both of which are manufactured by Nakatsuka Metal Foil Powder Co., Ltd.) and the like.

Specific examples of the aluminium paste include WB0230 and WXM0630 (both of which are manufactured by Toyo Aluminium K.K.), SUPER FINE No. 22000WN and SUPER FINE 18000WN (both of which are manufactured by Yamato Metal Powder Co., Ltd.) and the like. Examples of the coloured aluminium include FRIEND COLOUR F350 BL-W, FRIEND COLOUR GR-W, F100 BL-W and F100 GR-W (all of which are manufactured by Showa Denko K.K.) and the like.

When the colouring material used is crushed fine fragments which are aluminium coated with coloured resin layers, it is particularly easy to impart multiple colours and excellent radiation of brightness may be obtained.

Specific examples of commercially available crushed fine fragments include ELgee neo R-GOLD #35, ELgee neo R-GOLD #100, ELgee neo R-GOLD #150, ELgee neo R-GOLD #200, ELgee neo R-GOLD #325, ELgee neo R-GOLD #500, ELgee neo B-GOLD #35, ELgee neo B-GOLD #100, ELgee neo B-GOLD #150, ELgee neo B-GOLD #200, ELgee neo B-GOLD #325, ELgee neo B-GOLD #500, ELgee neo S-GOLD #35, ELgee neo S-GOLD #100, ELgee neo S-GOLD #150, ELgee neo S-GOLD #200, ELgee neo S-GOLD #325, ELgee neo S-GOLD #500, ELgee neo RED #100, ELgee neo RED #150, ELgee neo RED #200, ELgee neo RED #325, ELgee neo BLUE #100, ELgee neo BLUE #150, ELgee neo BLUE #200, ELgee neo BLUE #325, ELgee neo GREEN #100, ELgee neo GREEN #150, ELgee neo GREEN #200, ELgee neo GREEN #325, ELgee neo VIOLET #100, ELgee neo VIOLET #150, ELgee neo VIOLET #200, ELgee neo VIOLET #325, ELgee neo BLACK #100, ELgee neo BLACK #150, ELgee neo BLACK #200, ELgee neo BLACK #325, ELgee neo COPPER #100, ELgee neo COPPER #150, ELgee neo COPPER #200, ELgee neo COPPER #325, ELgee neo PINK #100, ELgee neo PINK #150, ELgee neo PINK #200, ELgee neo PINK #325, ELgee neo YELLOW #100, ELgee neo YELLOW #150, ELgee neo YELLOW #200 and ELgee neo YELLOW #325 (all of which are manufactured by Oike Imaging K.K.) and the like.

Specific examples of commercially available pearl pigments include Iriodin 205 Rutile platinum Gold (titanium oxide coating ratio: 43%, particle size: 10 μm or more and 60 μm or less), Iriodin 215 Rutile Red Pearl (titanium oxide coating ratio: 47%, particle size: 10 μm or more and 60 μm or less), Iriodin 219 Rutile Lilac Pearl (titanium oxide coating ratio: 48%, particle size: 10 μm or more and 60 μm or less), Iriodin 225 (titanium oxide coating ratio: 52%, particle size: 10 μm or more and 60 μm or less) and Iriodin 235 (titanium oxide coating ratio: 57%, particle size: 10 μm or more and 60 μm or less) (all of which are manufactured by Merck Ltd., Japan), PEARL-GLAZE MB-100R (titanium oxide coating ratio: 52%, particle size: 10 μm or more and 60 μm or less), PEARL-GLAZE MG-100R (titanium oxide coating ratio: 57%, particle size: 10 μm or more and 60 μm or less), MR-100R (titanium oxide coating ratio: 47%, 10 μm or more and 60 μm or less), PEARL-GLAZE MV-100R (titanium oxide coating ratio: 48%, particle size: 10 μm or more and 60 μm or less), PEARL-GLAZE MRB-100R (titanium oxide coating ratio: 47%, particle size: 10 μm or more and 60 μm or less), PEARL-GLAZE MY-100R (titanium oxide coating ratio: 43%, particle size: 10 μm or more and 60 μm or less), PEARL-GLAZE MB-100RF (titanium oxide coating ratio: 62%, particle size: 5 μm or more and 30 μm or less), PEARL-GLAZE MG-100RF (titanium oxide coating ratio: 65%, particle size: 5 μm or more and 30 μm or less), PEARL-GLAZE MRB-100RF (titanium oxide coating ratio: 56, particle size: 10 μm or more and 30 μm or less), PEARL-GLAZE MY-100RF (titanium oxide coating ratio: 57%, particle size: 5 μm or more and 30 μm or less), ULTIMICA YB-100 (titanium oxide coating ratio: 43%, particle size: 5 μm or more and 30 μm or less), ULTIMICA YD-100 (titanium oxide coating ratio: 43%, particle size: 10 μm or more and 60 μm or less), ULTIMICA RB-100 (titanium oxide coating ratio: 47%, particle size: 5 μm or more and 30 μm or less), ULTIMICA RD-100 (titanium oxide coating ratio: 47%, particle size: 10 μm or more and 60 μm or less), ULTIMICA VB-100 (titanium oxide coating ratio: 48%, particle size: 5 μm or more and 30 μm or less), ULTIMICA VD-100 (titanium oxide coating ratio: 48%, particle size: 10 μm or more and 60 μm or less), ULTIMICA GB-100 (titanium oxide coating ratio: 65%, particle size: 5 μm or more and 30 μm or less) and ULTIMICA GD-100 (titanium oxide coating ratio: 65%, 10 μm or more and 60 μm or less) (all of which are manufactured by Nihon Koken Kogyo Co., Ltd.) and the like.

When a pigment is used, conventionally known surfactants and water-soluble polymers may be used as a dispersion auxiliary agent and a penetrating agent. For example, resins such as salts of styrene-acrylic acid copolymers, styrene-maleic acid copolymers and acrylic acid-acrylate ester copolymers, shellac and humic acid, and surfactants such as polyoxyethylene alkyl ethers, polyoxyethylene alkyl phenyl ethers, polyoxyethylene alkyl ether phosphates and salts thereof, polyoxyethylene/polyoxypropylene alkyl ethers and polyoxyethylene sorbitan fatty acid esters may be used as needed.

When the colouring material used is a pigment, the pigment may be a water-dispersed pigment or one finely dispersed in a polymer compound. In this case, handling of the pigment may be improved to result in improved productivity, and the dispersion efficiency of the pigment in an aqueous ink composition may also be increased.

Specific examples of water-dispersed pigments include Fuji SP Black 8031, Fuji SP Black 8119, Fuji SP Black 8167, Fuji SP Black 8276, Fuji SP Black 8381, Fuji SP Black 8406, Fuji SP Red 5096, Fuji SP Red 5111, Fuji SP Red 5193, Fuji SP Red 5220, Fuji SP Bordeaux 5500, Fuji SP Blue 6062, Fuji SP Blue 6133, Fuji SP Blue 6134, Fuji SP Blue 6401, Fuji SP Green 7051, Fuji SP Yellow 4060, Fuji SP Yellow 4178, Fuji SP Violet 9011, Fuji SP Pink 9524, Fuji SP Pink 9527, Fuji SP Orange 534, FUji SP Brown 3074, FUJI SP RED 5543 and FUJI SP RED 5544 (all of which are manufactured by Fuji Pigment Co., Ltd.), Emacol Black CN, Emacol Blue FBB, Emacol Blue FB, Emacol Blue KR, Emacol Green LXB, Emacol Violet BL, Emacol Brown 3101, Emacol Carmmine FB, Emacol Red BS, Emacol Orange R, Emacol Yellow FD, Emacol Yellow IRN, Emacol Yellow 3601, Emacol Yellow FGN, Emacol Yellow GN, Emacol Yellow GC; Emacol Yellow F5G, Emacol Yellow F7G, Emacol Yellow 10GN, Emacol Yellow 10G, Sandye Super Black K, Sandye Super Black C, Sandye Super Grey B, Sandye Super Brown SB, Sandye Super Brown FRL, Sandye Super Brown RR, Sandye Super Green L5G, Sandye Super Green GXB, Sandye Super Navy Blue HRL, Sandye Super Navy Blue GLL, Sandye Super Navy Blue HB, Sandye Super Navy Blue FBL-H, Sandye Super Navy Blue FBL-160, Sandye Super Navy Blue FBB, Sandye Super Violet BL H/C, Sandye Super Violet BL, Sandye Super Bordeaux FR, Sandye Super Pink FBL, Sandye Super Pink FSB, Sandye Super Rubine FR, Sandye Super Carmine FB, Sandye Super Red FFG, Sandye Super Red RR, Sandye Super Red BS, Sandye Super Red 1315, Sandye Super Orange FL, Sandye Super Orange R, Sandye Super Orange BO, Sandye Gold Yellow 5GR, Sandye Gold Yellow R, Sandye Gold Yellow 3R, Sandye Yellow GG, Sandye Yellow F3R, Sandye Yellow 1RC, Sandye Yellow FGN, Sandye Yellow GN, Sandye Yellow GRS, Sandye Yellow GSR-130, Sandye Yellow GSN-130, Sandye Yellow GSN and Sandye Yellow 10GN (all of which are manufactured by Sanyo Color Works, Ltd.), Rio Fast Black Fx 8012, Rio Fast Black Fx 8313, Rio Fast Black Fx 8169, Rio Fast Red Fx 8209, Rio Fast Red Fx 172, Rio Fast Red S Fx 8315, Rio Fast Red S Fx 8316, Rio Fast Blue Fx 8170, Rio Fast Blue FX 8170, Rio Fast Blue S Fx 8312, Rio Fast Green S Fx 8314 and EM green G (all of which are manufactured by Toyo Ink Co., Ltd.), NKW-2101, NKW-2102, NKW-2103, NKW-2104, NKW-2105, NKW-2106, NKW-2107, NKW-2108, NKW-2117, NKW-2127, NKW-2137, NKW-2167, NKW-2101P, NKW-2102P, NKW-2103P, NKW-2104P, NKW-2105P, NKW-2106P, NKW-2107P, NKW-2108P, NKW-2117P, NKW-2127P, NKW-2137P, NKW-2167P, NKW-3002, NKW-3003, NKW-3004, NKW-3005, NKW-3007, NKW-3077, NKW-3008, NKW-3402, NKW-3404, NKW-3405, NKW-3407, NKW-3408, NKW-3477, NKW-3602, NKW-3603, NKW-3604, NKW-3605, NKW-3607, NKW-3677, NKW-3608, NKW-3702, NKW-3703, NKW-3704, NKW-3705, NKW-3777, NKW-3708, NKW-6013, NKW-6038 and NKW-6559 (all of which are manufactured by Nippon Keiko Kagaku Co., Ltd.), Cosmo Colour S1000F series (manufactured by Toyo Soda K.K.), Victoria Yellow G-11, Victoria Yellow G-20, Victoria Orange G-16, Victoria Orange G-21, Victoria Red G-19, Victoria Red G-22, Victoria Pink G-17, Victoria Pink G-23, Victoria Green G-18, Victoria Green G-24, Victoria Blue G-15 and Victoria Blue G-25 (all of which are manufactured by Mikuni-Color Co., Ltd.), POLLUX series such as POLLUX PC5T1020, POLLUX Black PC8T135 and POLLUX Red IT1030 (all of which are manufactured by Sumika Color Co., Ltd.) and the like.

Examples of pigments which are finely dispersed in polymer compounds include Microlith Yellow 3G-K, Microlith Yellow 4G-K, Microlith Yellow 3R-K, Microlith Scarlet R-K, Microlith DPP Red B-K, Microlith Magenta 5B-K, Microlith Violet B-K Microlith Blue A3R-K, Microlith Blue 4G-K, Microlith Green G-K, Microlith Black C-K and Microlith White R-K (pigments finely dispersed in vinyl chloride-vinyl acetate copolymer resins, manufactured by Ciba Specialty Chemicals), IK Yellow, IK Red, IK Blue, IK Green and IK Black (pigments finely dispersed in vinyl chloride-vinyl acetate copolymer resins, manufactured by Fuji Pigment Co., Ltd.), Microlith Yellow 2G-T, Microlith Yellow 3R-T, Microlith Brown 5R-T, Microlith Scarlet R-T, Microlith Red BR-T, Microlith Blue GS-T, Microlith Green G-T and Microlith Black C-T (all of which are pigments finely dispersed in rosin ester resins, and manufactured by Ciba Specialty Chemicals), Microlith Yellow 4G-A, Microlith Yellow MX-A, Microlith Yellow 2R-A, Microlith Brown 5R-A, Microlith Scarlet R-A, Microlith Red 2C-A, Microlith Red 3R-A, Microlith Magenta 2B-A, Microlith Violet B-A, Microlith Blue 4G-A, Microlith Green G-A, Microlith Black C-A and Microlith White R-A (all of which are pigments finely dispersed in ethylcellulose resins, and manufactured by Ciba Specialty Chemicals), L1/S Yellow NIF, L1/8 Red F3RK-70, L1/8Violet RN50, L1/8 Orange 501, L1/8 Brown 5R, L1/8 Black MA100 and NC790 White (all of which are pigments finely dispersed in nitrocellulose resins, and manufactured by Taihei Chemicals Limited), Renol Yellow GG-HW, Renol Yellow HR-HW, Renol Orange RL-HW, Renol Red FGR-HW, Renol Red HF2B-HW, Renol Red F5RK-HW, Renol Carmine FSB-HW, Renol Violet RL-HW, Renol Blue B2G-HW, Renol Green GG-HW, Renol Brown HFR-HW, Renol Black R-HW and Renol White T-HW (all of which are pigments finely dispersed in polyvinyl butyral resins, and manufactured by Clariant Japan KK.), Fuji AS Black 810, Fuji AS Red 575, Fuji AS Blue 650, Fuji AS Green 737 and Fuji AS White 165 (all of which are pigments finely dispersed in polyvinyl butyral resins, and manufactured by Fuji Pigment Co., Ltd.) and the like.

One of the colouring materials may be used or two or more thereof may be mixed and used. The ink composition contains the colouring material preferably at 1.0 wt % or more and 25.0 wt % or less and more preferably 5.0 wt % or more and 15.0 wt % or less relative to the total amount of the ink composition.

In some embodiments, the ink composition may contain an organic solvent for suppressing drying or freezing of ink. When the ink composition contains an organic solvent, drying of ink at nibs and the like and freezing of ink under low temperatures may be suppressed.

Specific examples of the organic solvent include alcohol solvents such as ethanol, 1-propanol, 2-propanol, 1-butanol, 2-butanol, 3-methoxy-1-butanol, 3-methoxy-3-methyl-1-butanol, 3-methyl-3-methoxy-pentanol benzyl alcohol, β-phenylethyl alcohol, α-methylbenzyl alcohol, lauryl alcohol, tridecyl alcohol, isododecyl alcohol and isotridodecyl alcohol; glycols such as ethylene glycol, diethylene glycol, triethylene glycol, propylene glycol, polyethylene glycol, hexylene glycol, 1,3-butylene glycol, thiodiethylene glycol, glycerol, benzyl glycol and benzyl diglycol; glycol ethers such as ethylene glycol monomethyl ether, propylene glycol monomethyl ether, diethylene glycol monomethyl ether, dipropylene glycol monomethyl ether, ethylene glycol monoethyl ether, propylene glycol monoethyl ether, diethylene glycol monoethyl ether, dipropylene glycol monoethyl ether, ethylene glycol monobutyl ether, ethylene glycol monohexyl ether, ethylene glycol monophenyl ether, diethylene glycol monobutyl ether, diethylene glycol monohexyl ether, diethylene glycol monophenyl ether, propylene glycol monobutyl ether, propylene glycol monophenyl ether, tripropylene glycol monobutyl ether and tripropylene glycol monophenyl ether; propylene glycol methyl ether acetate, propylene glycol diacetate, 2-pyrrolidone, N-methyl-2-pyrrolidone and the like.

One of the organic solvents may be used or two or more thereof may be mixed and used. The ink composition contains the organic solvent preferably at 5.0 wt % or more and 60.0 wt % or less relative to the total amount of the ink composition.

The ink composition according to some embodiments may be produced according to various methods that have been conventionally known.

In one embodiment, the ink composition may be obtained by dispersing, in water, titanium oxide particles having an average particle size of 0.1 μm or more and 0.4 μm or less, hollow resin particles having an average particle size of 1.0 μm or more and 2.0 μm or less and a polysaccharide.

For example, the ink composition may be easily obtained by mixing and stirring the titanium oxide particles, the hollow resin particles, the polysaccharide and water on an agitator having high shear force such as Henschel mixer, propeller agitator, homogenizer, turbo mixer and high pressure homogenizer.

In the preparation steps, generated dispersion heat may be directly used while stirring or stirring may be performed while heating. Heat may further be applied after preparation of the ink.

EXAMPLES

The present invention is specifically described hereinafter by way of Examples.

(Electrostatic Charge Measurement for Titanium Oxide Particles and Hollow Resin Particles)

Measurement device: manufactured by Otsuka Electronics Co., Ltd., zeta potential analysing system, model number: ELSZ-2000

Measurement conditions: Ion-exchanged water was added to a measurement cell to dilute a sample to be measured with ion-exchanged water to 0.005 wt %. The pH of the sample was adjusted so that the sample had the pH indicated in each of Examples and Comparative Examples at the time of measurement (pH controlling agents: acidic pH controlling solution: hydrochloric acid aqueous solution, 0.1 mol/L, alkaline pH controlling solution: sodium hydroxide aqueous solution, 1 mol/L).

As used herein, the phrase the titanium oxide particles and hollow resin particles are "negatively charged" means that the result obtained by the above electrostatic charge measurement is negative. The titanium oxide particles and the hollow resin particles preferably have a value of the electrostatic charge measurement (zeta potential) of −80 mV or more and −10 mV or less because dispersion stability is high. It is also preferable that the difference of the zeta potential between negatively charged particles is within 15 mV because dispersion stability is high.

(pH Measurement)

Measurement device: Horiba, Ltd., pH meter, AS-712

Measurement conditions: The pH meter was calibrated with standard solutions. A sample for zeta potential measurement was diluted with ion-exchanged water to 0.005 wt %, and ink compositions of Examples and Comparative Examples were measured as they were without dilution.

The ink preferably has a pH of 5.0 or more and 10.0 or less and more preferably 7.0 or more and 9.0 or less.

Example 1

Fuji SP White #1186 (dispersion of titanium oxide particles, oil absorption: 33 g/100 g, average particle size: 0.24 μm, titanium oxide particles: 50.0 wt %, manufactured by Fuji Pigment Co., Ltd., the result of the zeta potential measurement was −36.64 mV) 20.00 wt % ROPAQUE SN-1055 (dispersion of hollow resin particles [styrene-acrylic copolymer], average particle size: 1.0 μm, amount of solid matters: 26.5 wt %, manufactured by Rohm and Haas Japan KK, the result of the zeta potential measurement was −38.68 mV) 40.00 wt %
JONCRYL 61J (film-forming resin, acrylic resin solution, amount of solid matters: 30.5 wt %, manufactured by BASF Japan Ltd.) 3.00 wt %
PLAS COAT Z-1100 (film-forming resin, saturated polyester resin solution, amount of solid matters: 20 wt %, Goo Chemical Co., Ltd.) 1.00 wt %
BYK035 (silicone active agent, manufactured by BYK Japan KK) 0.30 wt %
KELZAN AR (polysaccharide, xanthan gum, manufactured by Sansho Co., Ltd.) 0.40 wt % Ethylene glycol 10.00 wt %
San-ai bac sodium omadine (antifungal agent, manufactured by San-ai Oil Co., Ltd.) 0.20 wt %
Proxel GXL (preservative, 1,2-benzisothiazolin-3-one, manufactured by ICI Japan K.K.) 0.10 wt %
PO20 (nib drying preventing agent, sugar alcohol, manufactured by Towa Chemical Industry Co., Ltd.) 2.00 wt %
TL10 (active agent, polyoxyethylene coconut oil fatty acid sorbitan, manufactured by Nikko Chemicals Co., Ltd.) 1.00 wt %
Ion-exchanged water 22.00 wt %

Among the above components, the whole amount of KELZAN AR and 6.00 wt % of ion-exchanged water were stirred for 1 hour to prepare a xanthan gum aqueous solution, the rest of the components were then added thereto, and the mixture was stirred on a homo disper for 1 hour, thereby obtaining an aqueous white ink composition for ballpoint pens.

Fuji SP White #1186 and ROPAQUE SN-1055 were respectively subjected to the electrostatic charge measurement, resulting in negative values.

Example 2

Fuji SP White #1186 (described above, the result of the zeta potential measurement was −31.12 mV) 15.00 wt %
ROPAQUE SN-1055 (described above, the result of the zeta potential measurement was −38.94 mV) 31.00 wt %
LUMICOL NKW-C2104E (colouring material, orange-coloured solid resin particles [styrene-acrylonitrile copolymer], average particle size: 0.4 μm, Nippon Keiko Kagaku Co., Ltd.) 11.00 wt %
JONCRYL 61J (described above) 3.00 wt %
PLAS COAT Z-1100 (described above) 1.00 wt %
BYK035 (described above) 0.30 wt %
KELZAN AR (described above) 0.40 wt %
Ethylene glycol 10.00 wt %
San-ai bac sodium omadine (described above) 0.20 wt %
Proxel GXL (described above) 0.10 wt %
P020 (described above) 2.00 wt %
TL10 (described above) 1.00 wt %
Ion-exchanged water 25.00 wt %

Among the above components, the whole amount of KELZAN AR and 6.00 wt % of ion-exchanged water were stirred for 1 hour to prepare a xanthan gum aqueous solution, the rest of the components were then added thereto, and the mixture was stirred on a homo diaper for 1 hour, thereby obtaining an aqueous orange ink composition for ballpoint pens.

Fuji SP White #1186 and ROPAQUE SN-1055 were respectively subjected to the electrostatic charge measurement, resulting in negative values.

Example 3

Fuji SP White #383 (dispersion of titanium oxide particles, oil absorption: 33 g/100 g, average particle size: 0.24 μm, product containing 50.0 wt % titanium oxide particles, manufactured by Fuji Pigment Co., Ltd., the result of the zeta potential measurement was −38.68 mV) 20.00 wt %

ROPAQUE SN-1055 (described above, the result of the zeta potential measurement was −42.42 mV) 40.00 wt %
JONCRYL 61J (described above) 4.00 wt %
BYK035 (described above) 0.30 wt %
KELZAN AR (described above) 0.40 wt %
Ethylene glycol 10.00 wt %
San-ai bac sodium omadine (described above) 0.20 wt %
Proxel GXL (described above) 0.10 wt %
PO20 (described above) 2.00 wt %
TL10 (described above) 1.00 wt %
Ion-exchanged water 22.00 wt %

Among the above components, the whole amount of KELZAN AR and 6.00 wt % of ion-exchanged water were stirred for 1 hour to prepare a xanthan gum aqueous solution, the rest of the components were then added thereto, and the mixture was stirred on a homo diaper for 1 hour, thereby obtaining an aqueous white ink composition for ballpoint pens.

Fuji SP White #383 and ROPAQUE SN-1055 were respectively subjected to the electrostatic charge measurement, resulting in negative values.

Example 4

Fuji SP White #383 (described above, the result of the zeta potential measurement was −33.44 mV) 15.00 wt %
ROPAQUE SN-1055 (described above, the result of the zeta potential measurement was −38.94 mV) 31.00 wt %
LUMICOL NKW-C2105E (colouring material, yellow solid resin particles [styrene-acrylonitrile copolymer], average particle size: 0.4 μm, Nippon Keiko Kagaku Co., Ltd.) 11.00 wt %
JONCRYL 61J (described above) 4.00 wt %
BYK035 (described above) 0.30 wt %
KELZAN AR (described above) 0.40 wt %
Ethylene glycol 10.00 wt %
San-ai bac sodium omadine (described above) 0.20 wt %
Proxel GXL (described above) 0.10 wt %
PO20 (described above) 2.00 wt %
TL10 (described above) 1.00 wt %
Ion-exchanged water 25.00 wt %

Among the above components, the whole amount of KELZAN AR and 6.00 wt % of ion-exchanged water were stirred for 1 hour to prepare a xanthan gum aqueous solution, the rest of the components were then added thereto, and the mixture was stirred on a homo disper for 1 hour, thereby obtaining an aqueous yellow ink composition for ballpoint pens.

Fuji SP White #383 and ROPAQUE SN-1055 were respectively subjected to the electrostatic charge measurement, resulting in negative values.

Example 5

TIPAQUE R550 (titanium oxide particles, average particle size: 0.24 μm, oil absorption: 23 g/100 g, Ishihara Sangyo Kaisha, Ltd.) 45.00 wt %
ROPAQUE SN-1055 (described above, the result of the zeta potential measurement was −42.42 mV) 15.00 wt %
Polyvinylpyrrolidone PVP-K30 (manufactured by ISP Japan K.K.) LOO wt %
BYK035 (described above) 0.30 wt %
KELZAN AR (described above) 0.20 wt %
Ethylene glycol 10.00 wt %
San-ai bac sodium omadine (described above) 0.20 wt %
Proxel GXL (described above) 0.10 wt %
PO20 (described above) 2.00 wt %
TL10 (described above) 1.00 wt %
Ion-exchanged water 25.20 wt %

Among the above components, the whole amount of TIPAQUE R550, the whole amount of JONCRYL 61J and 19.20 wt % of ion-exchanged water were mixed and dispersed on a bead mill for 15 minutes to prepare a dispersion of titanium oxide particles. Further, the whole amount of KELZAN AR and 6.00 wt % of ion-exchanged water were stirred for 1 hour to prepare a xanthan gum aqueous solution. The dispersion of the titanium oxide particles and the xanthan gum aqueous solution were mixed, the rest of the components were added thereto, and the mixture was stirred on a homo disper for 1 hour, thereby obtaining an aqueous white ink composition for ballpoint pens.

The dispersion of the titanium oxide particles and ROPAQUE SN-1055 were respectively subjected to the electrostatic charge measurement, resulting in negative values.

Example 6

TITANIX JR-800 (titanium oxide particles, average particle size: 0.27 μm, oil absorption: 29 g/100 g, manufactured by Titan Kogyo, Ltd.) 40.00 wt %
ROPAQUE SN-1055 (described above, the result of the zeta potential measurement was −42.42 mV) 20.00 wt %
JONCRYL 61J (described above) 4.00 wt %
KELZAN AR (described above) 0.20 wt %
Ethylene glycol 10.00 wt %
San-ai bac sodium omadine (described above) 0.20 wt %
Proxel GXL (described above) 0.10 wt %
PO20 (described above) 2.00 wt %
Ion-exchanged water 23.50 wt %

Among the above components, the whole amount of TITANIX JR-800, the whole amount of JONCRYL 61J and 17.50 wt % of ion-exchanged water were mixed and dispersed on a bead mill for 15 minutes to prepare a dispersion of titanium oxide particles. Further, the whole amount of KELZAN AR and 6.00 wt % of ion-exchanged water were stirred for 1 hour to prepare a xanthan gum aqueous solution. The dispersion of the titanium oxide particles and the xanthan gum aqueous solution were mixed, the rest of the components were added thereto, and the mixture was stirred on a homo disper for 1 hour, thereby obtaining an aqueous white ink composition for ballpoint pens.

The dispersion of the titanium oxide particles and ROPAQUE SN-1055 were respectively subjected to the electrostatic charge measurement, resulting in negative values.

Example 7

Fuji SP White #1186 (described above, the result of the zeta potential measurement was −36.64 mV) 20.00 wt %
ROPAQUE SN-1055 (described above, the result of the zeta potential measurement was −42.42 mV) 40.00 wt %
JONCRYL 61J (described above) 3.00 wt %
WATERSOL CD-550LAP (film-forming resin, unsaturated polyester resin solution, amount of solid matters: 40 wt %, DIC Corporation) 1.00 wt %
TSA739 (silicone active agent, manufactured by Momentive Performance Materials Japan LLC) 0.30 wt
KELZAN AR (described above) 0.40 wt %
Ethylene glycol 5.00 wt %
Glycerol 5.00 wt %
San-ai bac sodium omadine (described above) 0.20 wt %
Proxel GXL (described above) 0.10 wt %

PO20 (described above) 2.00 wt %
TL10 (described above) 1.00 wt %
Ion-exchanged water 22.00 wt %

Among the above components, the whole amount of KELZAN AR and 6.00 wt % of ion-exchanged water were stirred for 1 hour to prepare a xanthan gum aqueous solution, the rest of the components were then added thereto, and the mixture was stirred on a homo disper for 1 hour, thereby obtaining an aqueous white ink composition for ballpoint pens.

Fuji SP White #1186 and ROPAQUE SN-1055 were respectively subjected to the electrostatic charge measurement, resulting in negative values.

Example 8

Fuji SP White #1186 (described above, the result of the zeta potential measurement was −36.64 mV) 10.00 wt %
ROPAQUE SN-1055 (described above, the result of the zeta potential measurement was −42.42 mV) 75.00 wt %
JONCRYL 61J (described above) 1.00 wt %
EPAN 420 (POEPOP block polymer, manufactured by DKS Co., Ltd.) 0.30 wt %
KELZAN AR (described above) 0.40 wt %
Ethylene glycol 3.00 wt %
San-ai bac sodium omadine (described above) 0.20 wt %
Proxel GXL (described above) 0.10 wt %
PO20 (described above) 2.00 wt %
TL10 (described above) 1.00 wt %
Ion-exchanged water 7.00 wt %

Among the above components, the whole amount of KELZAN AR and 6.00 wt % of ion-exchanged water were stirred for 1 hour to prepare a xanthan gum aqueous solution, the rest of the components were then added thereto, and the mixture was stirred on a homo disper for 1 hour, thereby obtaining an aqueous white ink composition for ballpoint pens.

Fuji SP White #1186 and ROPAQUE SN-1055 were respectively subjected to the electrostatic charge measurement, resulting in negative values.

Example 9

TITANIX JR-801 (titanium oxide particles, average particle size: 0.27 μm, oil absorption: 40 g/100 g, manufactured by Titan Kogyo, Ltd.) 4.00 wt %
ROPAQUE SN-1055 (described above, the result of the zeta potential measurement was 42.42 mV) 80.00 wt %
YSA6403 (silicone active agent, manufactured by Momentive Performance Materials Japan LLC) 0.30 wt %
KELZAN AR (described above) 0.40 wt %
Ethylene glycol 3.00 wt %
San-ai bac sodium omadine (described above) 0.20 wt %
Proxel GXL (described above) 0.10 wt %
PO20 (described above) 2.00 wt %
TL10 (described above) 1.00 wt %
Ion-exchanged water 9.00 wt %

Among the above components, the whole amount of TITANIX JR-801, the whole amount of JONCRYL 61J and 2.00 wt % of ion-exchanged water were mixed and dispersed on a bead mill for 15 minutes to prepare a dispersion of titanium oxide particles. Further, the whole amount of KELZAN AR and 6.00 wt % of ion-exchanged water were stirred for 1 hour to prepare a xanthan gum aqueous solution. The dispersion of the titanium oxide particles and the xanthan gum aqueous solution were mixed, the rest of the components were added thereto, and the mixture was stirred on a homo disper for 1 hour, thereby obtaining an aqueous white ink composition for ballpoint pens.

The dispersion of the titanium oxide particles and ROPAQUE SN-1055 were respectively subjected to the electrostatic charge measurement, resulting in negative values.

Example 10

As the ink composition, the ink composition as in Example 1 was used.

Example 11

As the ink composition, the ink composition as in Example 1 was used.

Comparative Example 1

Fuji SP White #1186 (described above, the result of the zeta potential measurement was −36.64 mV) 20.00 wt %
Matsumoto Microsphere MEIB-R (hollow resin particles [methyl methacrylate crosspolymer], average particle size: 10.0 μm, manufactured by Matsumoto Yushi-Seiyaku Co., Ltd.) 10.00 wt %
JONCRYL 61J (described above) 3.00 wt %
PLAS COAT Z-1100 (described above) 1.00 wt %
BYK035 (described above) 0.30 wt %
KELZAN AR (described above) 0.40 wt %
Ethylene glycol 10.00 wt %
San-ai bac sodium omadine (described above) 0.20 wt %
Proxel GXL (described above) 0.10 wt %
PO20 (described above) 2.00 wt %
TL10 (described above) 1.00 wt %
Ion-exchanged water 52.00 wt %

Among the above components, the whole amount of Matsumoto Microsphere MHB-R, the whole amount of JONCRYL 61J and 46.00 wt % of ion-exchanged water were mixed and stirred on a homo disper for 30 minutes to prepare a dispersion of hollow resin particles. Further, the whole amount of KELZAN AR and 6.00 wt % of ion-exchanged water were stirred for 1 hour to prepare a xanthan gum aqueous solution. The dispersion of the resin particles and the xanthan gum aqueous solution were mixed, the rest of the components were added thereto, and the mixture was stirred on a homo disper for 1 hour, thereby obtaining an aqueous white ink composition for ballpoint pens.

Fuji SP White #1186 and the dispersion of the hollow resin particles were respectively subjected to the electrostatic charge measurement, resulting in negative values.

Comparative Example 2

Fuji SP White #1186 (described above, the result of the zeta potential measurement was −36.64 mV) 20.00 wt %
ROPAQUE OP-84J (dispersion of hollow resin particles [styrene-acrylic copolymer], average particle size: 0.55 μm, amount of solid matters: 42.5 wt %, manufactured by Rohm and Haas Japan KK) 20.00 wt %
JONCRYL 61J (described above) 3.00 wt %
PLAS COAT Z-1100 (described above) 1.00 wt %
BYK035 (described above) 0.30 wt %
KELZAN AR (described above) 0.40 wt %
Ethylene glycol 10.00 wt %
San-ai bac sodium omadine (described above) 0.20 wt %
Proxel GXL (described above) 0.10 wt %
PO20 (described above) 2.00 wt %

TL10 (described above) 1.00 wt %
Ion-exchanged water 42.00 wt %

Among the above components, the whole amount of KELZAN AR and 6.00 wt % of ion-exchanged water were stirred for 1 hour to prepare a xanthan gum aqueous solution, the rest of the components were then added thereto, and the mixture was stirred on a homo disper for 1 hour, thereby obtaining an aqueous white ink composition for ballpoint pens.

Fuji SP White #1186 and ROPAQUE OP-84J were respectively subjected to the electrostatic charge measurement, resulting in negative values.

Comparative Example 3

Fuji SP White #1186 (described above, the result of the zeta potential measurement was −36.64 mV) 20.00 wt %
FINE SPHERE FS-301 (solid resin particles [styrene-acrylic copolymer], average particle size: 1.0 μm, manufactured by Nippon Paint Co., Ltd.) 10.00 wt %
JONCRYL 61J (described above) 3.00 wt %
PLAS COAT Z-1100 (described above) 1.00 wt %
BYK035 (described above) 0.30 wt %
KELZAN AR (described above) 0.40 wt %
Ethylene glycol 10.00 wt %
San-ai bac sodium omadine (described above) 0.20 wt %
Proxel GXL (described above) 0.10 wt %
PO20 (described above) 2.00 wt %
TL10 (described above) 1.00 wt %
Ion-exchanged water 52.00 wt %

Among the above components, the whole amount of FINE SPHERE FS-301, the whole amount of JONCRYL 61J and 46.00 wt % of ion-exchanged water were mixed and stirred on a homo disper for 30 minutes to obtain a dispersion of solid resin particles. Further, the whole amount of KELZAN AR and 6.00 wt % of ion-exchanged water were stirred for 1 hour to prepare a xanthan gum aqueous solution. The dispersion of resin particles and the xanthan gum aqueous solution were mixed, the rest of the components were added thereto, and the mixture was stirred on a homo disper for 1 hour, thereby obtaining an aqueous white ink composition for ballpoint pens.

Fuji SP White #1186 and the dispersion of the solid resin particles were respectively subjected to the electrostatic charge measurement, resulting in negative values.

Comparative Example 4

TITANIX JR-301 (titanium oxide particles, average particle size: 0.30 μm, oil absorption: 18 g/100 g, manufactured by Titan Kogyo, Ltd.) 10.00 wt %
ROPAQUE SN-1055 (described above, the result of the zeta potential measurement was −42.42 mV) 40.00 wt %
JONCRYL 61J (described above) 3.00 wt %
PLAS COAT Z-1100 (described above) 1.00 wt %
BYK035 (described above) 0.30 wt %
KELZAN AR (described above) 0.40 wt %
Ethylene glycol 10.00 wt %
San-ai bac sodium omadine (described above) 0.20 wt %
Proxel GXL (described above) 0.10 wt %
PO20 (described above) 2.00 wt %
TL10 (described above) 1.00 wt %
Ion-exchanged water 32.00 wt %

Among the above components, the whole amount of TITANIX JR-301, the whole amount of JONCRYL 61J and 26.00 wt % of ion-exchanged water were mixed and dispersed on a bead mill for 15 minutes to prepare a dispersion of titanium oxide particles. Further, the whole amount of KELZAN AR and 6.00 wt % of ion-exchanged water were stirred for 1 hour to prepare a xanthan gum aqueous solution. The dispersion of the titanium oxide particles and the xanthan gum aqueous solution were mixed, the rest of the components were added thereto, and the mixture was stirred on a homo disper for 1 hour, thereby obtaining an aqueous white ink composition for ballpoint pens.

The dispersion of the titanium oxide particles and ROPAQUE SN-1055 were respectively subjected to the electrostatic charge measurement, resulting in a positive value for the dispersion of the titanium oxide particles and a negative value for ROPAQUE SN-1055.

Comparative Example 5

Fuji SP White #1186 (described above, the result of zeta potential measurement was 7.14 mV) 20.00 wt
ROPAQUE SN-1055 (described above, the result of zeta potential measurement was −5.02 mV) 40.00 wt %
Polyvinylpyrrolidone PVP-K30 (manufactured by ISP Japan K.K.) 3.00 wt %
BYK035 (described above) 0.30 wt %
KELZAN AR (described above) 0.40 wt %
Ethylene glycol 10.00 wt %
San-ai bac sodium omadine (described above) 0.20 wt %
Proxel GXL (described above) 0.10 wt %
PO20 (described above) 2.00 wt %
TL10 (described above) 1.00 wt %
Acetic acid (pH controlling agent) 1.00 wt %
Ion-exchanged water 22.00 wt %

Among the above components, the whole amount of KELZAN AR and 6.00 wt % of ion-exchanged water were stirred for 1 hour to prepare a xanthan gum aqueous solution, the rest of the components were then added thereto, and the mixture was stirred on a homo disper for 1 hour, thereby obtaining an aqueous white ink composition for ballpoint pens.

Fuji SP White #1186 and ROPAQUE SN-1055 were respectively subjected to the electrostatic charge measurement, resulting in a positive value for Fuji SP White #1186 and a negative value for ROPAQUE SN-1055.

(Ink Backward-Flow Preventing Composition 1)
Polybutene HV50 (polybutene, base material, manufactured by Nippon Petrochemicals Co., Ltd.) 95.0 wt %
AEROSIL R972 (silica fine particles, gelling agent, manufactured by Nippon Aerosil Co., Ltd.) 3.0 wt %
Rheopearl KL (dextrin fatty acid ester, manufactured by Chiba Flour Milling Co., Ltd.) 2.0 wt %

The components were mixed and stirred on a hot stirrer at 150° C. for 2 hours to obtain backward-flow preventing composition 1. The backward-flow preventing agent had a viscosity at 25° C. of 50000 mPa·S.

(Test Ballpoint Pen Tip)

In order to evaluate ink compositions of Examples and Comparative Examples, two types of test ballpoint pen tips were prepared. The actual measured dimensions of the test ballpoint pen tips are indicated in Table 1, corresponding positions for measurements are indicated in FIG. 4, FIG. 5 which is an arrow view of a section along line II-II' in FIG. 4 and FIG. 6 which is an arrow view of a section along line III-III' in FIG. 4.

The test ballpoint pen tip has, after flattening the surface of an inward projection 16 (see FIG. 3), a tapered pin (not shown) driven into the inward projection 16 in order to allow smooth rotation of a ball (first and second ballpoint pen tips)

or a ball receiving seat 19 having almost the same curvature as the ball 2 formed by pressing the ball 2 against the inward projection 16.

Figure 4:
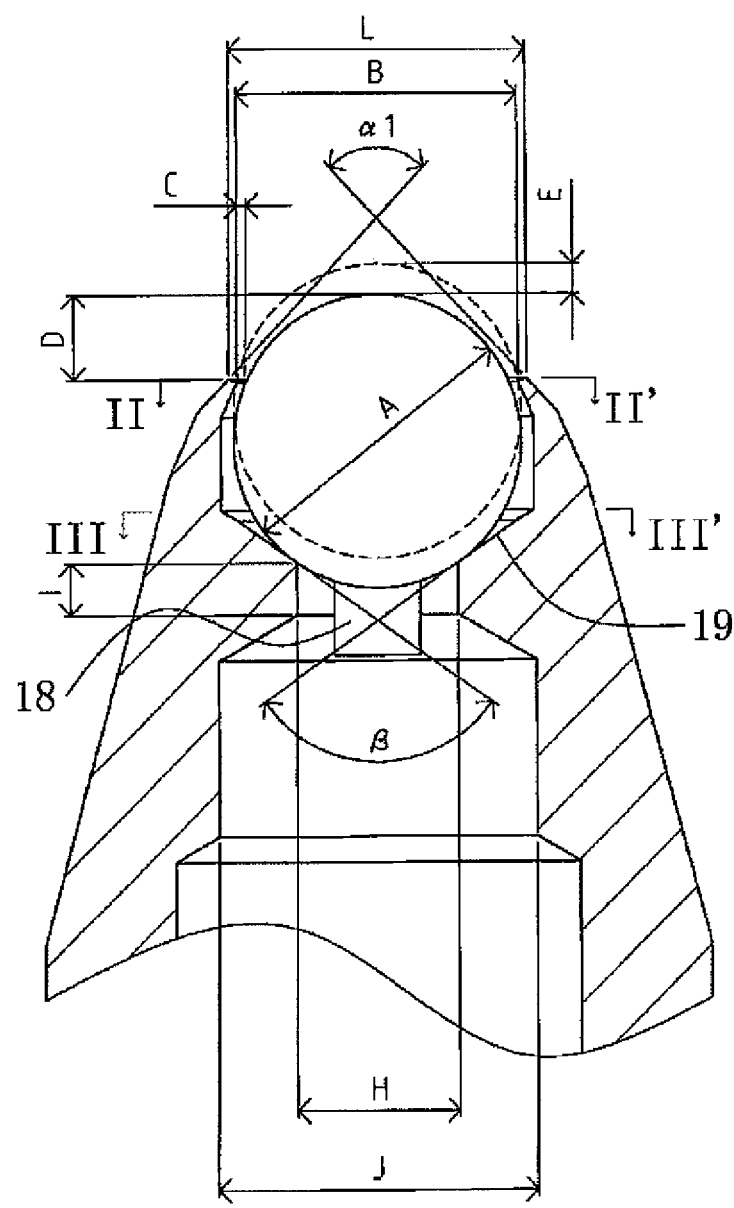
FIG. 4 is a vertical sectional view of a test ballpoint pen tip.
Figure 5:
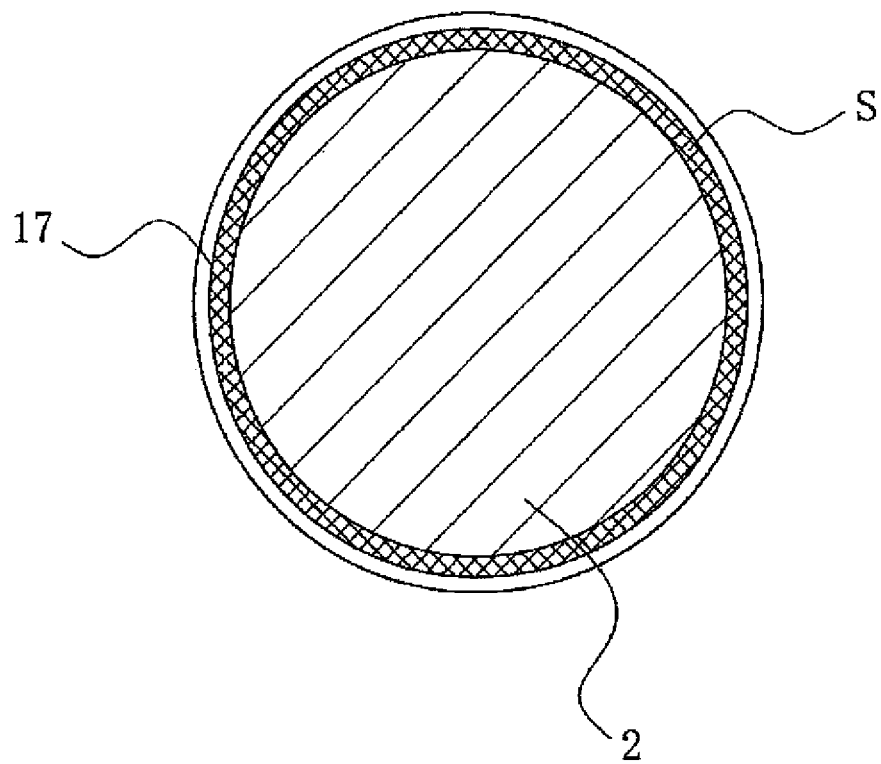
FIG. 5 is an arrow view of a section along line II-II' in FIG. 4.

FIG. 4 shows the ball 2 in the state of abutting against the distal opening 17 with a dotted line, and the amount of difference between the solid line and the dotted line indicates the displacement E in the back and forth direction of the ball 2. The distal opening gap width C is preferably 0.020 mm or more and 0.035 mm or less. The back and forth direction ball displacement E is preferably 0.050 mm or more and 0.120 mm or less. The ball house section diameter F is preferably 103% or more and 108% or less of the ball diameter. The radial groove width K is preferably 0.100 mm or more and 0.330 mm or less. When the dimensions are smaller than those described above, the clearance through which ink passes is insufficient and ink cannot be discharged, causing starving of a writing line and clogging. When the dimensions are bigger than those described above, air may be easily entrained due to an impact at the time of dropping.

FIG. 5 illustrates the magnitude of a distal opening 17 from which ink is discharged in the ballpoint pen tip when the ball 2 sits on the ball receiving seat 19. The grid-like region S illustrated the projected area of the distal opening 17 formed between the ball 2 and the ball house section 13.

Figure 6:
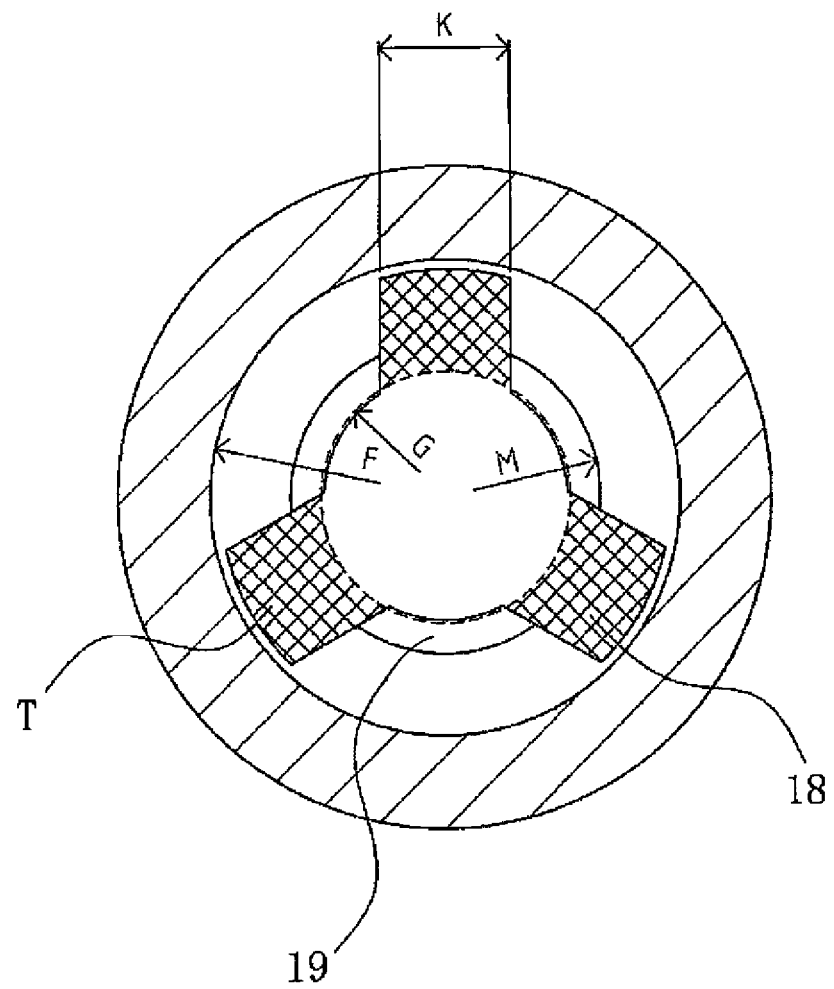
FIG. 6 is an arrow view of a section along line III-III' in FIG. 4.

FIG. 6 does not indicate the ball 2 for convenience of explanation. A dotted line drawn so as to meet the ball receiving seat 19 and the radial groove 18 illustrates the portion to which the ball 2 contacts when the ball 2 sits on the ball receiving seat 19.

The dimensions of the parts in the test first, second, third and fourth ballpoint pen tips are indicated in Table 1.

The dimensions of the ballpoint pen tips were measured on a measuring scope STM6 manufactured by Olympus Corporation.

TABLE 1

| Dimensions of ballpoint pen tips | First ballpoint pen tip | Second ballpoint pen tip | Third ballpoint pen tip | Fourth ballpoint pen tip |
| --- | --- | --- | --- | --- |
| Ball diameter A [mm] | 0.8 | 1.0 | 0.8 | 1.0 |
| Distal opening diameter B [mm] | 0.778 | 0.980 | 0.763 | 0.990 |
| Distal opening gap width C [mm] | 0.024 | 0.033 | 0.015 | 0.038 |
| Ball projection length D [mm] | 0.240 | 0.297 | 0.240 | 0.297 |
| Back and forth direction ball displacement E [mm] | 0.062 | 0.106 | 0.040 | 0.132 |
| Ball house section diameter F [mm] | 0.824 | 1.075 | 0.820 | 1.086 |
| Diameter of the portion where the receiving seat contacts the ball G [mm] | 0.412 | — | 0.412 | — |
| Middle hole diameter H [mm] | 0.378 | 0.479 | 0.378 | 0.479 |
| Middle hole length I [mm] | 0.252 | 0.332 | 0.252 | 0.332 |
| Rear hole diameter J [mm] | 0.922 | 1.115 | 0.922 | 1.115 |
| Radial groove width K [mm] | 0.111 | 0.305 | 0.070 | 0.350 |
| Distal portion outer diameter L [mm] | 0.828 | 1.030 | 0.828 | 1.030 |
| Spherical receiving seat outer diameter M [mm] | — | 0.580 | — | 0.580 |
| Number of radial grooves [—] | 5 | 3 | 5 | 3 |
| Caulking angle α [degree] | 70 | 70 | 70 | 70 |
| Ball receiving seat opening angle β [degree] | 118 | 120 | 118 | 120 |
| Distal opening area [mm$^2$] | 0.057 | 0.0098 | 0.035 | 0.114 |
| Radial groove opening area [mm$^2$] | 0.108 | 0.192 | 0.068 | 0.221 |

The balls 2 used for the respective test ballpoint pen tips were respectively made of a sintered ceramic mainly containing silicon carbide (product name: Black Safarin, manufactured by Tsubaki Nakashima Co., Ltd.) and had an arithmetic average height Ra (JIS B 0601) of 3.0 mu. The ball holder used was made of stainless steel (product name: SF20T, manufactured by Shimomura Tokushu Seiko Co., Ltd.) and had a Vickers hardness (HV) of 240.

The tip holder 5 was a shaped polybutylene terephthalate resin, and a through hole 4 connecting from the rear of the ballpoint pen tip 1 to the ink storage tube had a minimum inner diameter of 1.31 mm.

The ink storage tube 6 was a pipe shaped by extrusion moulding of a polypropylene resin having an inner diameter of 2.6 mm and a thickness of 0.7 mm. The pipe was filled with 0.6 g of ink and 0.1 g of ink backward-flow preventing composition.

Each test ballpoint pen tip was attached to the ink storage tube through the tip holder, test ballpoint pens filled the ink backward-flow preventing composition 1 were prepared in Examples 1 to 9 and Comparative Examples 1 to 4 of the ink compositions, and the writing line and writing performance were evaluated according to the tests described hereinbelow.

(Air Entrainment Test)

A 10-cm line was drawn on a black high-quality paper sheet (thick, YCP, 3-4-23, manufactured by Yamazakura Co., Ltd.), the ballpoint pen was then dropped on a *cryptomeria* board from a 1-cm height with the nib facing upwards to apply an impact. Another 10-cm line was then drawn and whether a writing line was continuous or not was observed. When the writing line was continuous, the same test was repeated while increasing the height from the *cryptomeria* board by 1 cm each time until the writing line became intermittent. The higher the height until occurrence of an intermittent writing line is, the less air entrainment the ink has.

(Chattering Noise Test)

The same black high-quality paper sheet as above was provided. The ballpoint pen was held standing upright at an angle of 90 degrees relative to the plane of paper, a circle of about 3-cm diameter was drawn 5 times so that the position of the ball in the ball holder changes, and the number of positions where chattering noise occurred was counted.

(Writing Test)

With a rotational continuous writing tester (spiral machine, manufactured by Seiki Kogyo Kenkyusyo), the ballpoint pen was used for continuous writing at a writing speed of 7 cm/sec, a load of 100 gf and an angle of 70° to measure the shift in the writing line density and the distance of the writing line with starving.

(Masking Test)

The same black high-quality paper sheet as above was provided. The same pen was used for filling an area with the width of 15 mm and the length of 50 mm by writing in the width and length directions. After drying, the plane masked by the ink was measured for the Y value at 5 points with a colorimeter (Spectrophotometer SE6000, manufactured by Nippon Denshoku Industries Co., Ltd.), and the values were averaged. The higher the value is, the higher the masking effect is, and the Y value of 35.0 or more is recognised as a preferable masking effect.

The results of the above tests are indicated in Table 2.

Examples 1 to 11 have preferable dispersion stability, the titanium oxide particles and the hollow resin particles in the ink compositions do not precipitate in an object of drawing and may be retained on the surface of the object of drawing when ink compositions are attached to the object of drawing

TABLE 2

| | Ballpoint pen tip | Air entrainment test | Chattering noise test | Writing test | Masking test | Viscosity mPa·s Under shear velocity of 0.1 s$^{-1}$ | Under shear velocity of 500 s$^{-1}$ | pH |
|---|---|---|---|---|---|---|---|---|
| Example 1 | Second ballpoint pen tip | 19 cm | 0 | The ink was used up without starving | 40.8 | 25000 | 70 | 8.0 |
| Example 2 | First ballpoint pen tip | 21 cm | 0 | The ink was used up without starving | 37.9 | 23000 | 70 | 7.7 |
| Example 3 | First ballpoint pen tip | 15 cm | 0 | The ink was used up without starving | 40.3 | 25000 | 70 | 8.0 |
| Example 4 | First ballpoint pen tip | 17 cm | 0 | The ink was used up without starving | 39.5 | 23000 | 70 | 7.7 |
| Example 5 | Second ballpoint pen tip | 8 cm | 0 | The ink was used up without starving | 43.0 | 45000 | 90 | 8.0 |
| Example 6 | First ballpoint pen tip | 10 cm | 0 | The ink was used up without starving | 42.1 | 45000 | 90 | 8.0 |
| Example 7 | Second ballpoint pen tip | 13 cm | 0 | The ink was used up without starving | 40.3 | 25000 | 70 | 8.0 |
| Example 8 | First ballpoint pen tip | 11 cm | 0 | The ink was used up without starving | 40.6 | 28000 | 75 | 8.0 |
| Example 9 | Second ballpoint pen tip | 7 cm | 0 | The ink was used up without starving | 41.1 | 29000 | 75 | 8.0 |
| Example 10 | Third ballpoint pen tip | 20 cm | 0 | Writing was impossible after 10 m | 39.8 | 25000 | 70 | 8.0 |
| Example 11 | Fourth ballpoint pen tip | 5 cm | 0 | The ink was used up without starving | 40.8 | 25000 | 70 | 8.0 |
| Comparative Example 1 | First ballpoint pen tip | 3 cm | 9 | Writing was impossible after 3 m | 25.3 | 25000 | 70 | 8.0 |
| Comparative Example 2 | First ballpoint pen tip | 3 cm | 5 | The ink was used up without starving | 23.8 | 25000 | 70 | 8.0 |
| Comparative Example 3 | First ballpoint pen tip | 1 cm | 8 | The ink was used up without starving | 25.1 | 25000 | 70 | 8.0 |
| Comparative Example 4 | First ballpoint pen tip | 3 cm | 5 | Writing was impossible after 3 m | 30 | 25000 | 70 | 8.0 |
| Comparative Example 5 | First ballpoint pen tip | 3 cm | 5 | Writing was impossible after 3 m | 30 | 25000 | 70 | 2.5 |

As indicated in Table 2, the ink compositions of Examples 1 to 11 have the results of masking test of 35.0 or more, and thus have a preferable masking effect.

The ink compositions of Examples 1 to 11 respectively contain titanium oxide particles having an average particle size of 0.1 μm or more and 0.4 μm or less and hollow resin particles having an average particle size of 1.0 μm or more and 2.0 μm or less, and thus it is believed that complexes containing the polysaccharide, the titanium oxide particles and the hollow resin particles are formed in the ink compositions and the complex as a whole has a specific gravity that is significantly lower than that of the titanium oxide particles. Moreover, in the ink compositions of Examples 1 to 11, the hollow resin particles have an appropriate size relative to the titanium oxide particles, and thus it is believed that complexes with high density can be easily formed in the ink compositions. Further, in the ink compositions of Examples 1 to 11, both titanium oxide particles and hollow resin particles are negatively charged, and thus it is believed that the titanium oxide particles and the hollow resin particles repel each other in the ink compositions, suppressing aggregation of particles and easily providing complexes with high density. Because of the above, it is believed that the ink compositions of Examples 1 to 11 have preferable dispersion stability. Because the ink compositions of such as a plane of paper. Therefore, it is believed that the ink compositions of Examples 1 to 11 could exhibit preferable masking ability.

The ink compositions of Examples 1 to 11 contain titanium oxide particles, resin particles having an average particle size of 1.0 μm or more and 2.0 μm or less, a polysaccharide and water, and thus complexes with mild bonding are formed in ink, causing no chattering noise during writing.

In addition, in the ink compositions of Examples 1 to 11, the writing line has a high masking effect because the titanium oxide particles are sufficiently retained on the surface of paper, the ink followability is preferable and the application surface is uniform.

It is believed that the ink compositions of Examples 1 to 11 contain hollow resin particles made of styrene-acrylic copolymers, and thus have a preferable effect of prevention of chattering noise.

In contrast, Comparative Example 1 contained resin particles that were too large, and thus clogging of ink and unstable ink discharge occurred. Chattering noise and air entrainment happened when the ball rotated without a supply of ink, and many regions filled by writing were untidy and uneven, resulting in generation of the areas that were not masked.

Comparative Example 2 contained resin particles that were too small and thus the size and stability of the complex was not sufficient. Therefore, the effect of prevention of contact between metals and the effect of relaxation of impact were insufficient and the penetration into the plane of paper was high, and thus chattering noise and air entrainment occurred and the regions filled by writing were not masked.

Comparative Example 3 contained resin particles that were solid resin particles which are harder than hollow resin particles. The solid resin particles had less frequency of light refraction and hardly allow diffuse reflection, and thus have poor development of white colour. Therefore, the complex was not sufficiently formed, had no cushioning effect, had less masking ability and was destroyed by an impact during generation of chattering noise and the like. Therefore, air was entrained and the regions filled by writing had poor masking effect.

The ink composition of Comparative Example 4 contained a mixture of positively-charged and negatively-charged particles, and thus the hollow resin particles and the titanium oxide particles attract each other due to opposite charges to form coarse aggregates in the ink composition, causing ink clogging and unstable ink discharge. Chattering noise and air entrainment occurred when the ball rotated without supply of ink, and many regions filled by writing were untidy and uneven, resulting in generation of the areas that were not masked.

It is believed that the ink composition of Comparative Example 5 had a pH in an acidic region and titanium oxide had positive charge and thus the ink composition had decreased dispersion stability. It is believed that because of the above, the result of writing test was not favourable.

The test ballpoint pen of Example 10 (test ballpoint pen obtained by combining the same ink composition as Example 1 and the third ballpoint pen tip) had the distal opening gap width C, back and forth direction ball displacement E, ball house section diameter F and radial groove width K of which dimensions were outside of preferable ranges, and thus starving occurred in the writing test and writing became impossible at 10 m.

The test ballpoint pen of Example 11 (test ballpoint pen obtained by combining the same ink composition as Example 1 and the fourth ballpoint pen tip) had the distal opening gap width C, back and forth direction ball displacement E, ball house section diameter F and radial groove width K of which dimensions were outside of preferable ranges, and thus air was entrained at 5 cm in the air entrainment test.

In contrast, the test ballpoint pens of Example 1 to 9 (test ballpoint pens containing the respective ink compositions of Examples 1 to 9 and the first or second ballpoint pen tip) having the first ballpoint pen tip or the second ballpoint pen tip had the distal opening gap width C, back and forth direction ball displacement E, ball house section diameter F and radial groove width K of which dimensions were all in preferable ranges (namely, the distal opening gap width C was 0.020 mm or more and 0.035 mm or less, the back and forth direction ball displacement E was 0.050 mm or more and 0.120 mm or less, the ball house section diameter F was 103% or more and 108% or less of a ball diameter and the radial groove width K was 0.100 mm or more and 0.330 mm or less). Therefore, the clearance through which ink passes is not too small, and thus ink can easily be discharged and starving during writing or clogging hardly occurs. The clearance through which ink passes is not too big, and thus air may be hardly entrained by an impact when a ballpoint pen is dropped.

As specifically described hereinabove, the ink compositions according to embodiments of the present invention have preferable masking ability and dispersion stability. The writing tool in which the ink compositions according to some embodiments are used hardly have chattering noise during writing or starving due to clogging, and allow smooth writing immediately after a pen is accidentally dropped.

The embodiments of the present invention have been described hereinabove. However, the present invention is not limited to the above embodiments, and encompasses modifications of the above embodiments and combinations of the embodiments.

As used herein, the expressions indicating equivalence between matters such as "identical", "equal" and "uniform" represent not only the state of strict equality but also the state of tolerance or presence of a difference that provides the same functions.

As used herein, the expressions "comprising", "containing" or "having" one constitutional element is not an exclusive expression that excludes the presence of other constitutional elements.

INDUSTRIAL APPLICABILITY

The present invention may be used for, for example, ink of writing tools typically including aqueous ballpoint pens, and more specifically, the present invention may be widely used for ink of writing tools such as cap type and knock type aqueous ballpoint pens.

REFERENCE SIGNS LIST

1 Ballpoint pen tip
2 Ball
3 Ball holder
4 Through-hole
5 Tip holder
6 Ink storage tube
7 Ink
8 Ink backward-flow preventing agent
9 Shaft tube
10 Tail plug
11 Tip metal
12 Cap
13 Ball house section
14 Middle hole
15 Rear hole
16 Inward projection
17 Distal opening
18 Radial groove
19 Ball receiving seat
20 Refill
30 Exterior casing
100 Writing tool
A Ball diameter
B Distal opening diameter
C Distal opening gap width
D Ball projection length
E Back and forth direction ball displacement
F Ball house section diameter
G Diameter of the portion where the receiving seat contacts the ball
H Middle hole diameter
I Middle hole length
J Rear hole diameter
K Radial groove width
L Distal portion outer diameter
M Spherical receiving seat outer diameter
α Caulking angle
β Ball receiving seat opening angle

The invention claimed is:

1. An ink composition comprising:
   titanium oxide particles having an average particle size of 0.1 μm or more and 0.4 μm or less;
   hollow resin particles having an average particle size of 1.0 μm or more and 2.0 μm or less;
   a polysaccharide;
   and water; wherein
   the titanium oxide particles and the hollow resin particles are negatively charged.

2. The ink composition according to claim 1, wherein the hollow resin particles are devoid of a colouring material adsorbed thereto.

3. The ink composition according to claim 1, wherein the hollow resin particles contain styrene-acrylic copolymer particles.

4. The ink composition according to claim 1 wherein the titanium oxide particles have an oil absorption of 29 g/100 g or more and 35 g/100 g or less.

5. The ink composition according to claim 1, comprising:
   5.0 wt % or more and 40.0 wt % or less of the titanium oxide particles; and
   5.0 wt % or more and 20.0 wt % or less of the hollow resin particles.

6. The ink composition according to claim 1, further comprising a surfactant.

7. The ink composition according to claim 6, wherein the surfactant contains a silicone active agent.

8. The ink composition according to claim 1, further comprising a film-forming resin.

9. The ink composition according to claim 8, wherein the film-forming resin contains at least one of an acrylic resin or a polyester resin.

10. The ink composition according to claim 9, wherein the polyester resin is a saturated polyester resin.

11. The ink composition according to claim 1, further comprising a colouring material.

12. A writing tool comprising:
    a writing section; and
    an ink storage section that stores the ink composition according to claim 1, wherein
    the writing tool is configured to supply the ink composition from the ink storage section to the writing section.

13. The writing tool according to claim 12, wherein
    the writing section includes a ballpoint pen tip that includes a ball and a ball holder having an inner space formed therein for rotatably holding the ball,
    the ballpoint pen tip has:
    a distal opening gap width of 0.020 mm or more and 0.035 mm or less, the distal opening gap width being a magnitude of a gap between the ball holder and the ball at a distal portion of the ball holder;
    a back and forth direction ball displacement of 0.050 mm or more and 0.120 mm or less, the back and forth direction ball displacement being a movable distance of the ball in a longitudinal direction of the writing section, the ball being in a state held by the ball holder;
    a ball house section diameter of 103% or more and 108% or less of a ball diameter, the ball house section diameter being a maximum diameter of the space in the ball holder; and
    a radial groove width of 0.100 mm or more and 0.330 mm or less, the radial groove width being a width of a radial groove radially formed in the ball holder so that the space and the ink storage section are communicated with each other.

* * * * *